United States Patent
Emigh

(10) Patent No.: US 8,220,258 B2
(45) Date of Patent: Jul. 17, 2012

(54) LINEAR ROLLER BEARING ASSEMBLY AND SUB-ASSEMBLY AND RECIPROCATING MACHINERY INCORPORATING THE SAME

(76) Inventor: S. Grant Emigh, Wilsonville, OR (US)

( * ) Notice: Subject to any disclaimer, the term of this patent is extended or adjusted under 35 U.S.C. 154(b) by 144 days.

(21) Appl. No.: 12/776,283

(22) Filed: May 7, 2010

(65) Prior Publication Data
US 2010/0281861 A1 Nov. 11, 2010

Related U.S. Application Data

(60) Provisional application No. 61/176,221, filed on May 7, 2009.

(51) Int. Cl.
*F01B 29/10* (2006.01)
*B21D 53/10* (2006.01)
*F16C 19/00* (2006.01)

(52) U.S. Cl. .... 60/525; 60/517; 29/898.03; 29/898.061; 29/898.062; 29/898.064; 384/50; 384/52

(58) Field of Classification Search ............ 60/517, 60/525; 29/898, 898.03, 898.061, 898.062, 29/898.064; 384/50, 52, 55, 56
See application file for complete search history.

(56) References Cited

U.S. PATENT DOCUMENTS

| | | | | |
|---|---|---|---|---|
| 3,538,706 A | * | 11/1970 | Toepel | 60/525 |
| 3,622,211 A | | 11/1971 | Mitton | |
| 3,643,049 A | * | 2/1972 | Lu Conic et al. | 200/503 |
| 3,739,648 A | * | 6/1973 | Payst | 74/89.2 |
| 3,810,689 A | * | 5/1974 | Moodie | 359/490.02 |
| 3,932,045 A | | 1/1976 | Hillberry et al. | |
| 3,956,895 A | | 5/1976 | Noble et al. | |
| 4,290,264 A | * | 9/1981 | Haines | 60/518 |
| 4,346,945 A | | 8/1982 | Tsuboi | |
| 4,400,941 A | | 8/1983 | Rauch | |
| 5,074,114 A | | 12/1991 | Meijer et al. | |
| 5,647,217 A | | 7/1997 | Penswick et al. | |
| 5,916,350 A | | 6/1999 | Varga | |
| 6,568,853 B2 | | 5/2003 | Mochizuki | |
| 7,240,580 B2 | | 7/2007 | Everman | |
| 2004/0197037 A1 | | 10/2004 | Weissflog | |

FOREIGN PATENT DOCUMENTS

| | | |
|---|---|---|
| JP | 2000104733 A | 4/2000 |
| JP | 2001221229 A | 8/2001 |
| KR | 1019920001073 A1 | 1/1992 |

OTHER PUBLICATIONS

Hargreaves, C.M., "The Philips Stirling Engine," pp. 123, 340-342, Elsevier, 1991.
ISA/KR, International Search Report/Written Opinion in related application PCT/US2010/034128, Jan. 3, 2011.

* cited by examiner

*Primary Examiner* — Hoang Nguyen
(74) *Attorney, Agent, or Firm* — Marger Johnson & McCollom, PC

(57) ABSTRACT

Linear roller bearing assemblies can include a hub, a collar around the hub and roller bearing sub-assemblies disposed in a radial pattern around the hub. The roller bearing sub-assemblies can guide linear movement of the hub relative to the collar along a selected direction. Each roller bearing sub-assembly can include a roller and straps wrapped partially around the roller. Each strap is connected to at least one of the hub and the collar. And at least one of the straps can be connected to the roller while at least one of the straps can be circumferentially free of the roller. The hub and collar are moveable relative to each other along the selected direction for a distance that is approximately half of a circumference of the roller. Methods of forming linear roller bearing assemblies are also disclosed, as are multi-cylinder Stirling engines and a thermal energy recovery system.

23 Claims, 21 Drawing Sheets

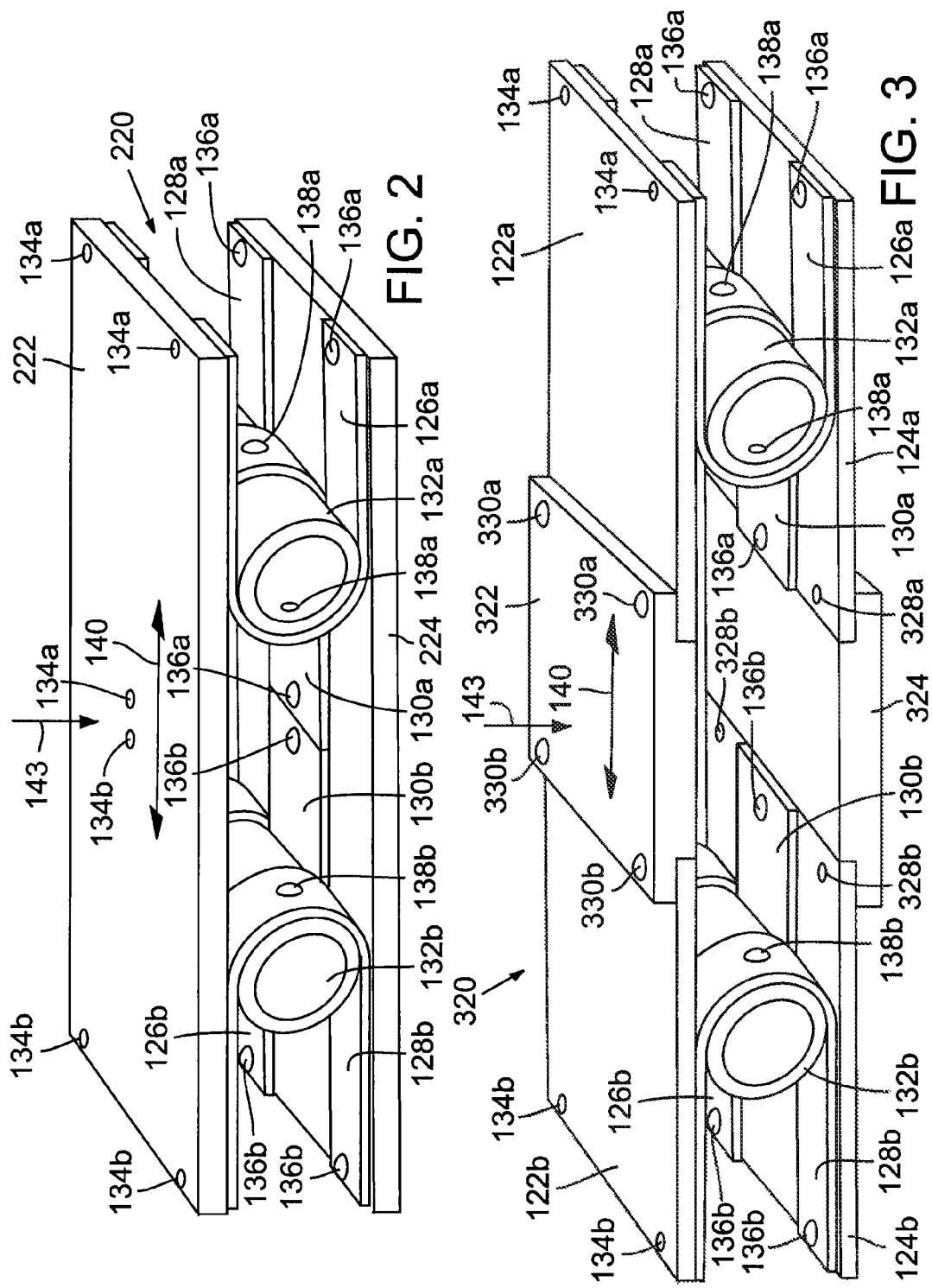

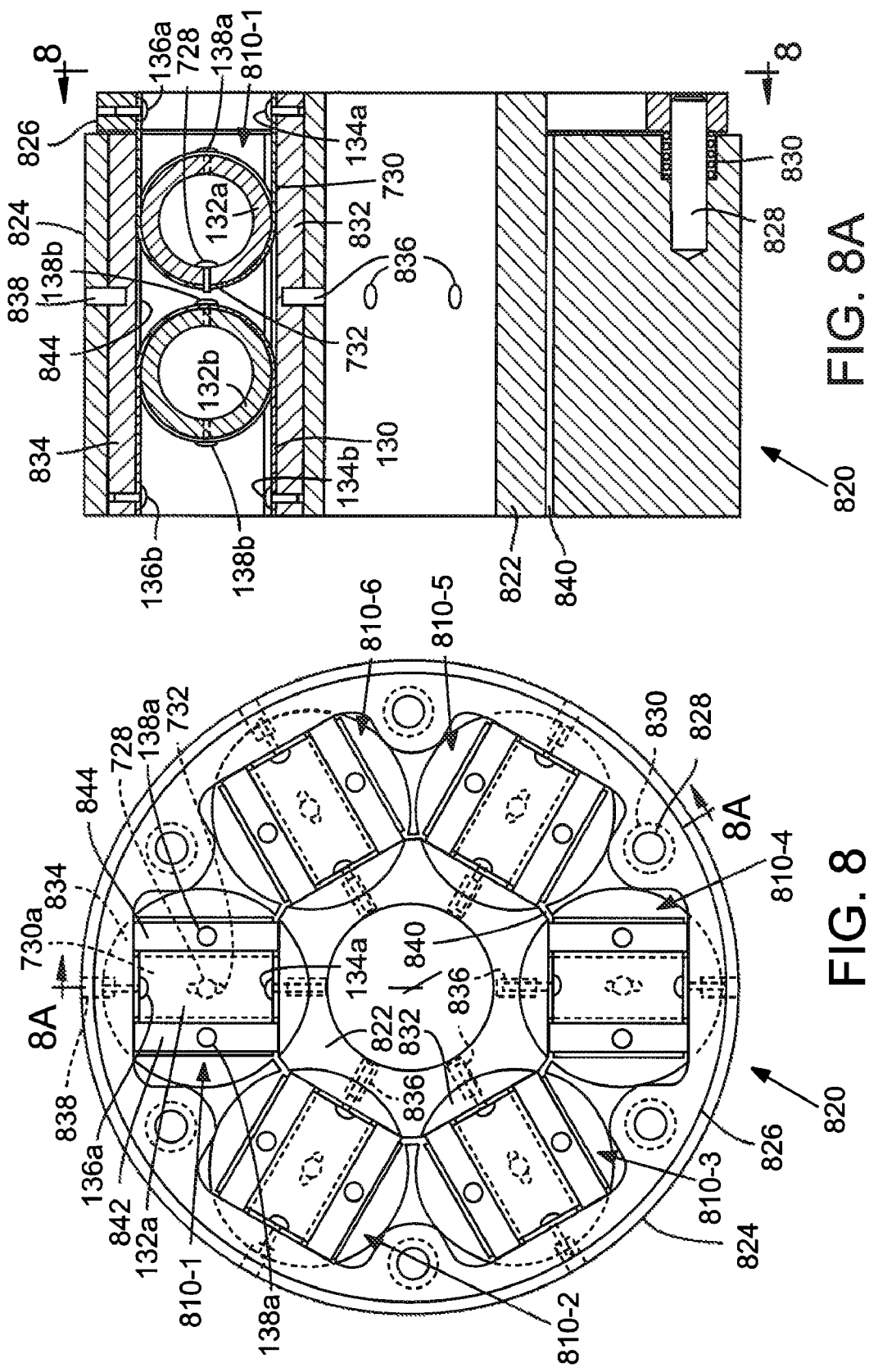

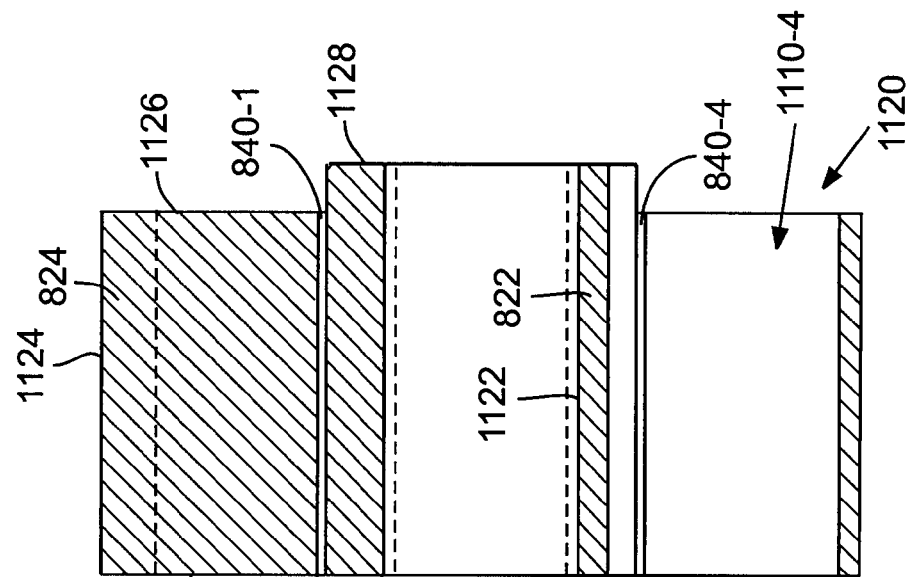
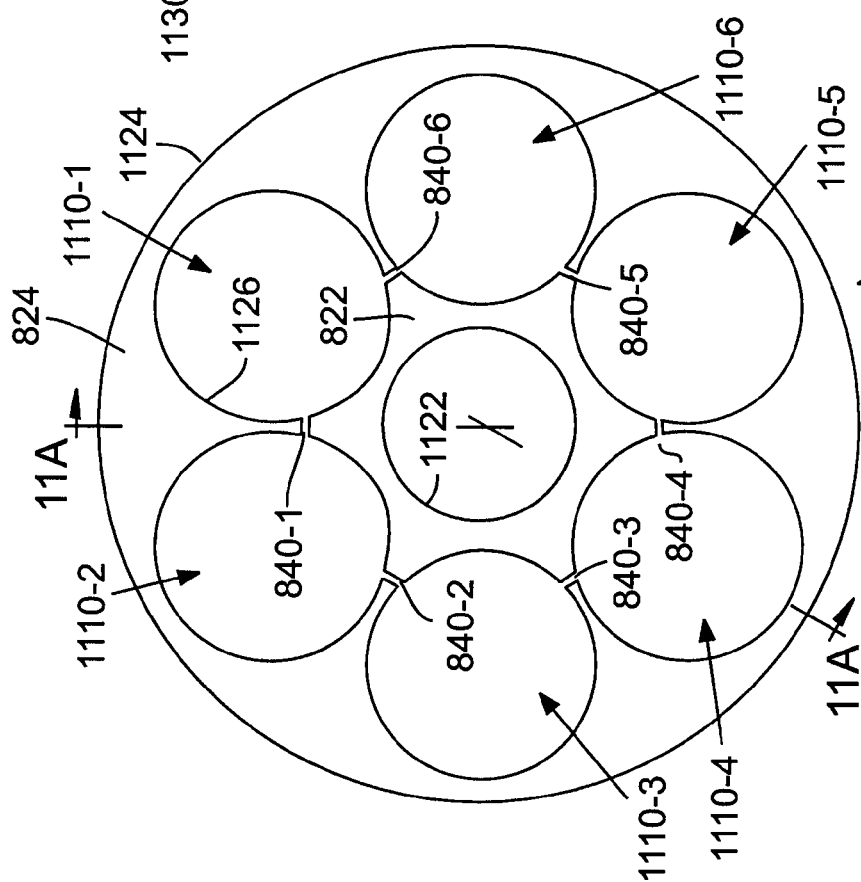

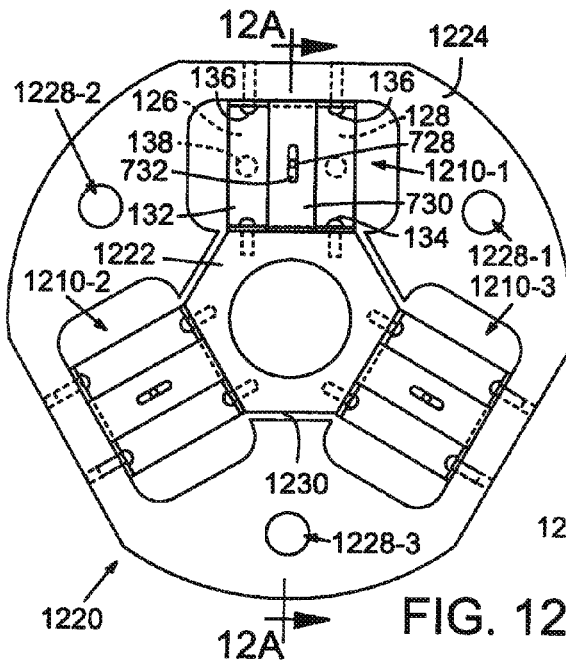
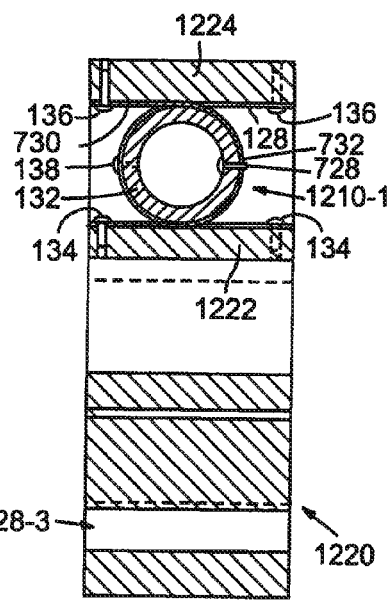
FIG. 12 FIG. 12A
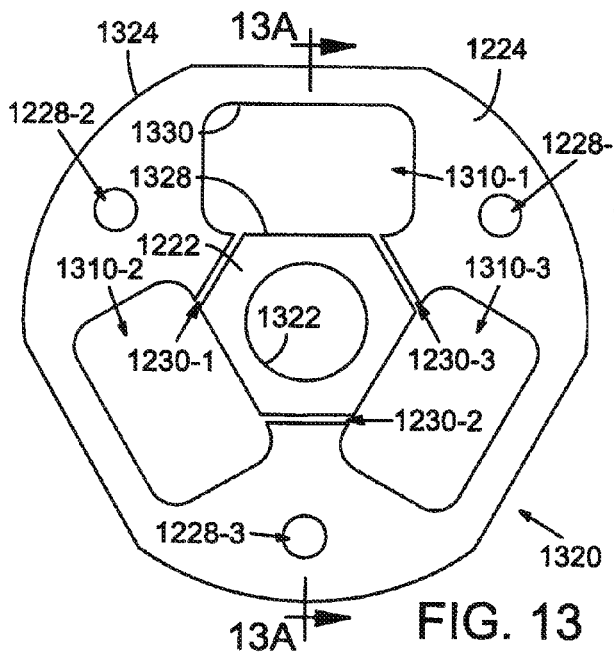
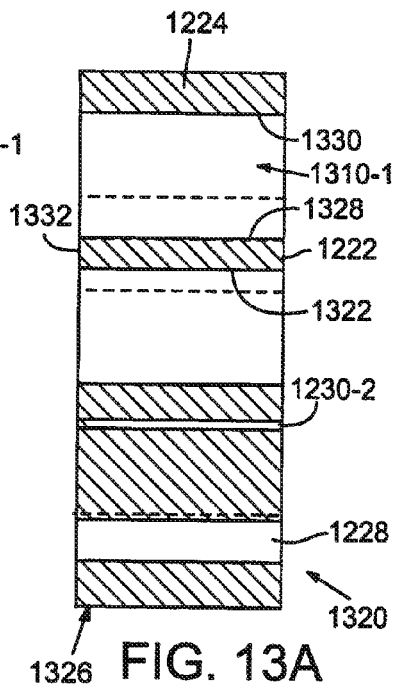
FIG. 13 FIG. 13A

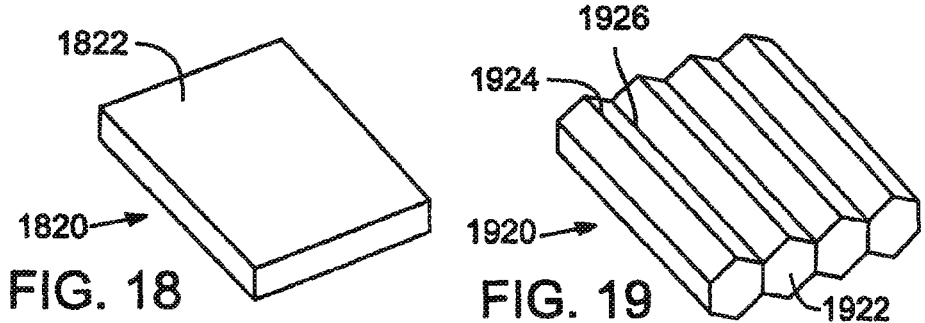
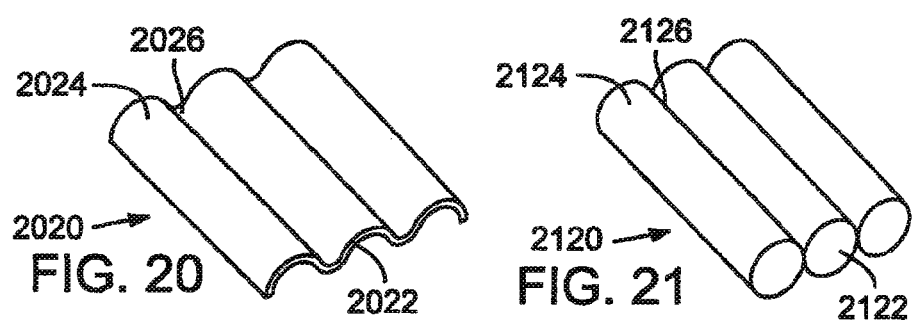
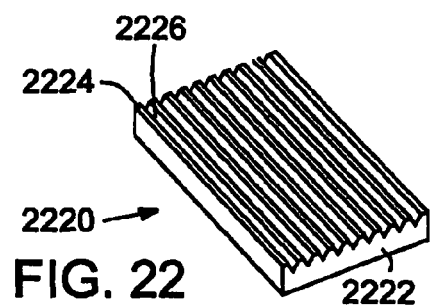

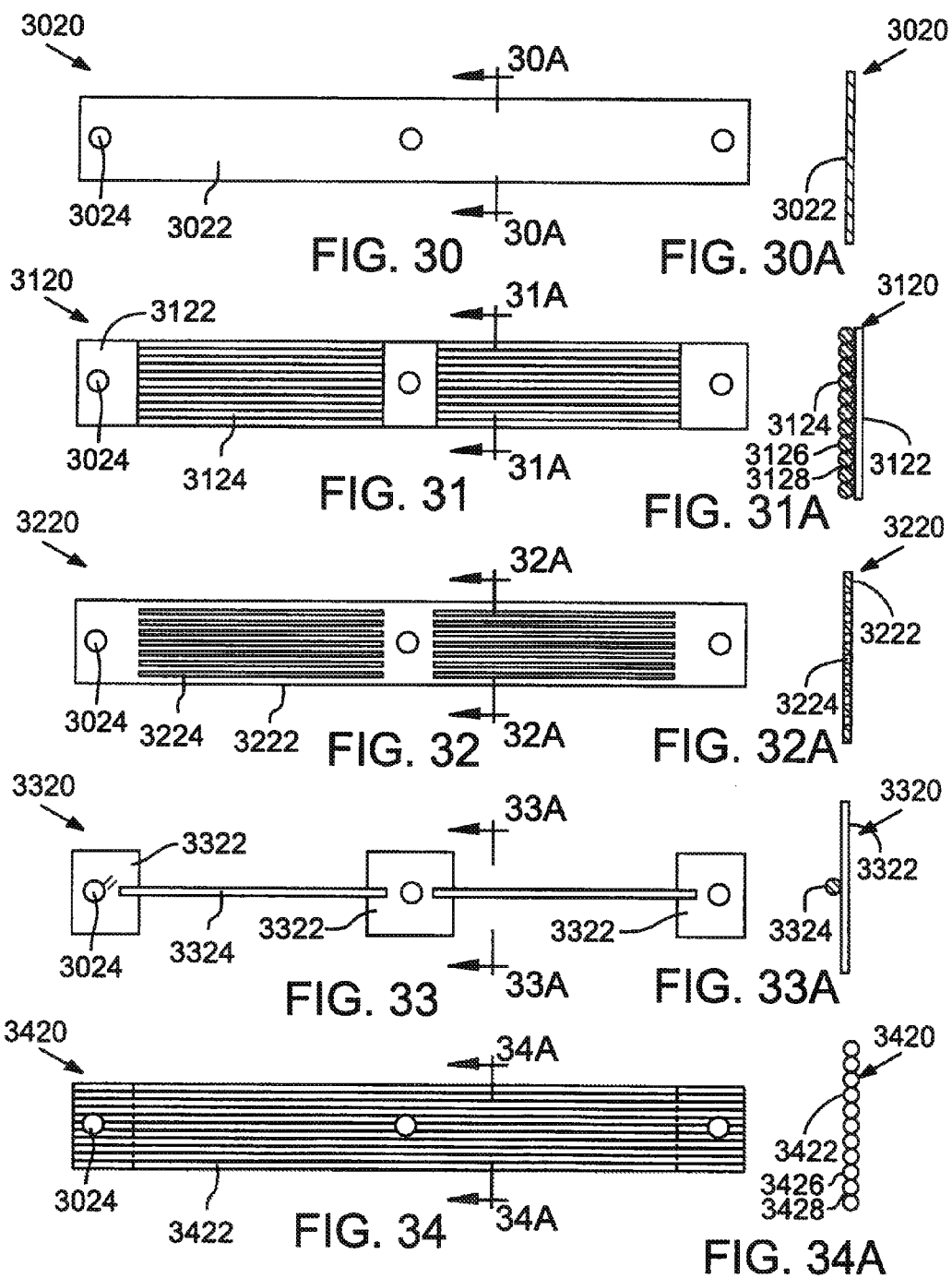

LINEAR ROLLER BEARING ASSEMBLY AND SUB-ASSEMBLY AND RECIPROCATING MACHINERY INCORPORATING THE SAME

CROSS-REFERENCE TO RELATED PATENT APPLICATION

This application claims the benefit of U.S. Provisional App. No. 61/176,221, filed on May 7, 2009, the disclosure of which is incorporated herein by reference in its entirety.

BACKGROUND

1. Technical Field

This disclosure relates to linear roller bearing assemblies, roller-bearing sub-assemblies, and reciprocating machinery incorporating the same, more particularly in Stirling engines and cryocoolers.

2. Description of the Related Art

Free-piston Stirling engines and cryocoolers include linear bearings to guide and support components such as pistons which reciprocate within a pressurized gas environment. Differential gas pressures across the piston are sealed by a narrow, non-contact annular gap (clearance seal). It is desirable to maintain concentricity of this gap to maximize performance and efficiency by minimizing energy losses due to gas leakage through said gap. These bearings should prevent contact between the piston and cylinder as it reciprocates so as to avoid wear and energy loss. Rubbing of the piston would reduce the machine's life and performance due to wear, and contamination of both the working gas and the internal heat exchangers. The bearings must support the lateral and rotational loads. The bearings should not require lubrication that would contaminate the working gas and thus reduce performance and efficiency.

Flexural spiral springs and/or gas bearings are currently used to provide the long life linear bearings for these types of machines. Commonly used spiral flexure bearings (see e.g. FIG. 6 of U.S. Pat. No. 5,647,217) are limited in their stroke capability, frequency of operation, and radial load capacity. Gas bearings are also used in these types of machines. They can be expensive to manufacture, due to the extremely close dimensional tolerances required. Wear can occur during start-up and shut-down when contact is made between their mating surfaces. These bearings can lock up if a small foreign particle becomes lodged between these precision surfaces. Simple gas bearings do not provide rotational restraint that is usually required by linear alternators or motors.

Linear roller bearings have been used to guide linear movement of one surface relative to another. For example, U.S. Pat. No. 3,932,045 (the '045 patent) directed primarily to rolling contact joints useful as prosthetic joints, shows a linear bearing in FIGS. 14-16. The linear bearing includes two rollers and straps wrapped tightly around each roller. One problem with the linear bearing shown in FIGS. 14 and 15 of the '045 patent is that, over time, the straps can loosen around the rollers. The rollers can therefore slide laterally or slip rotationally within the straps to degrade the performance of the linear bearing. While the linear bearing shown in FIG. 16 of the '045 patent appears to include edge guides disposed on opposite ends of the rollers, the rollers can additionally rub against these guides if the straps loosen around the rollers. This rubbing can cause undesirable wear and friction. With the potential for undesirable loosening of the straps, lateral slide and rotational slip of the roller, and an undesirable amount of wear and friction during operation, the linear bearing of the '045 patent is not suitable for use in machinery such as Stirling engines and cryocoolers having components which reciprocate at high frequencies.

U.S. Pat. No. 7,240,580 (the '580 patent) is understood to disclose the use of linear bearings within a Z-axis positioner. Specifically, linear bearings guide movement of a stage along a single axis relative to a base. The straps in these linear bearings can be attached to a roller, or simply wrapped around the roller. However, the stage does not reciprocate at the frequencies encountered by components of machines such as Stirling engines and cryocoolers. Also, movement of the stage appears to be limited to approximately one quarter of the circumference of the roller due to the configuration of the Z-axis positioner. Such limited movement is not desirable within machines such as Stirling engines and cryocoolers where relatively long stroke length is desired to achieve power or work output.

Accordingly, a need remains for a better linear bearing suitable for Stirling engines, cryocoolers and like applications.

SUMMARY

According to some embodiments, a linear roller bearing assembly is described as including a hub, a collar disposed around the hub and roller bearing sub-assemblies disposed in a radial pattern around the hub. The roller bearing sub-assemblies are configured to guide linear movement of the hub relative to the collar along a selected direction.

In one embodiment, each of the roller bearing sub-assemblies can include a roller and straps wrapped partially around different portions of the roller. Each of the straps is connected to the hub and/or the collar. At least one of the straps can be connected to the roller while at least one of the straps can be circumferentially free of the roller.

In another embodiment, the hub, collar and roller bearing sub-assemblies are configured such that the hub and collar are moveable relative to each other along the selected direction for a distance that is approximately half of a circumference of the roller in opposite directions from a mid-stroke position.

According to other embodiments, methods of forming linear roller bearing assemblies are disclosed which can permit the hub and collar to be fabricated in a complimentary manner.

According to other embodiments, multi-cylinder Stirling engines having Stirling engine power modules connected together in series to form a closed loop are disclosed. These multi-cylinder Stirling engines can achieve high thermodynamic engine efficiency and power density.

According to other embodiments, a thermal energy recovery system is disclosed to increase the Carnot efficiency of a Stirling engine power module.

BRIEF DESCRIPTION OF THE DRAWINGS

FIG. 2 is a perspective view of a roller bearing sub-assembly according to a second embodiment of the invention.

FIG. 3 is a perspective view of a roller bearing sub-assembly according to a third embodiment of the invention.

FIG. 8 is an end view of a linear roller bearing assembly according to an eighth embodiment of the invention.

FIG. 8A is a cross-sectional view of the linear roller bearing assembly shown in FIG. 8, taken along line 8A-8A of FIG. 8.

FIG. 11 is an end view illustrating the linear roller bearing assembly shown in FIG. 8 at an intermediate stage of fabrication.

FIG. 11A is a cross-sectional view of the linear roller bearing assembly shown in FIG. 8, taken along line 11A-11A of FIG. 11, at another intermediate stage of fabrication.

FIG. 12 is an end view of a linear roller bearing assembly according to an eleventh embodiment of the invention.

FIG. 12A is a cross-sectional view of the linear roller bearing assembly shown in FIG. 12, taken along line 12A-12A of FIG. 12.

FIG. 13 is an end view of the linear roller bearing assembly shown in FIGS. 12 and 12A at an intermediate stage of fabrication.

FIG. 13A is a cross-sectional view of the linear roller bearing assembly shown in FIG. 13, taken along line 13A-13A of FIG. 13.

FIGS. 18-22 are perspective views of various mounting portions in roller bearing sub-assemblies, according to some embodiments of the invention.

FIGS. 30-34 are top views of straps in roller bearing sub-assemblies according to some embodiments of the invention.

FIGS. 30A-34A are cross-sectional views of straps shown in FIGS. 30-34, respectively, according to some embodiments of the invention.

DETAILED DESCRIPTION OF THE
ILLUSTRATED EMBODIMENTS

Exemplary embodiments of the present invention will now be described more fully hereinafter with reference to the accompanying drawings. These embodiments, however, may be modified in many different forms and should not be construed as limited to the description expressly set forth herein. Rather, these embodiments are provided so that this disclosure will be thorough and complete, and will fully convey the scope of the invention to those skilled in the art. It will be understood that when an element is referred to as being "connected to," "on," etc., another element, it can be directly connected to or directly on the other element, or intervening elements may also be present. In contrast, when an element is referred to as being "directly connected to," "directly on," etc., another element, there are no intervening elements present. Like reference numbers refer to like elements throughout.

Embodiments of the present invention address several problems and limitations of bearings currently used to guide and support the reciprocating components within high frequency machines such as long-life, maintenance-free, Stirling engines and cryocoolers. These machines require precise alignment of their internal reciprocating pistons and attached components. Linear bearings exemplarily described herein can increase the performance and efficiency of these machines by providing increased guidance precision, stroke length, and frequency of operation, load capability and operating life. These bearings can also be advantageously used in many other types of reciprocating machinery, as well as in any other type of machinery where precise movement along a single axis is desired.

Roller Bearing Sub-Assembly

Figure 1:
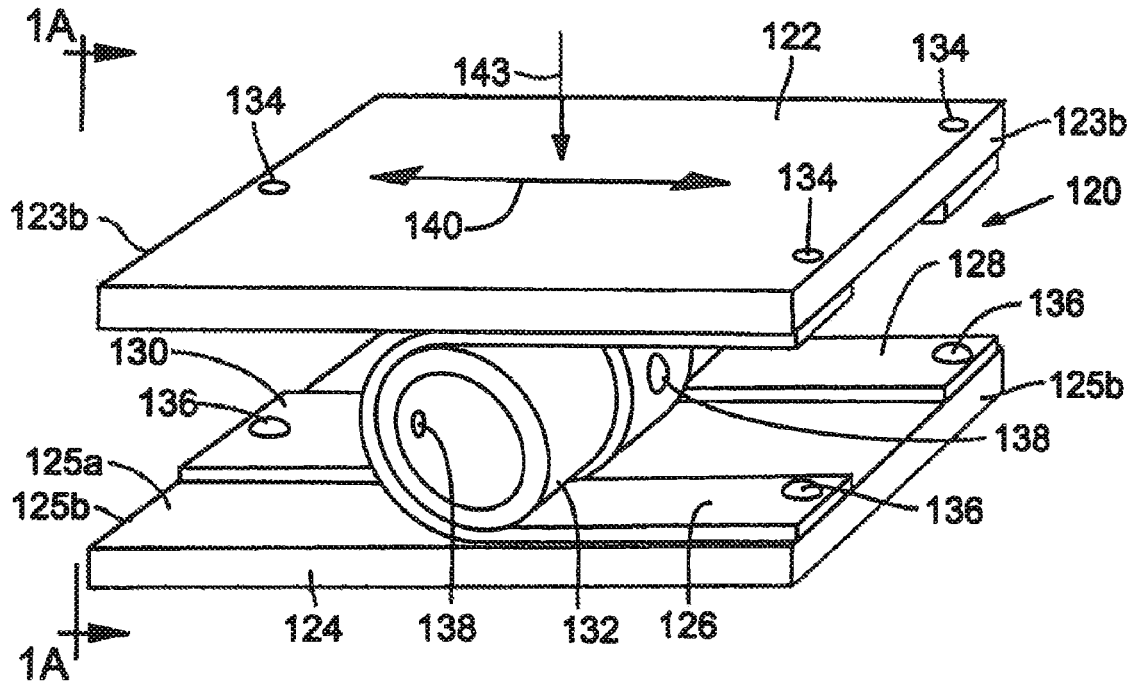
FIG. 1 is a perspective view of a roller bearing sub-assembly according to a first embodiment of the invention.
Figure 1A:
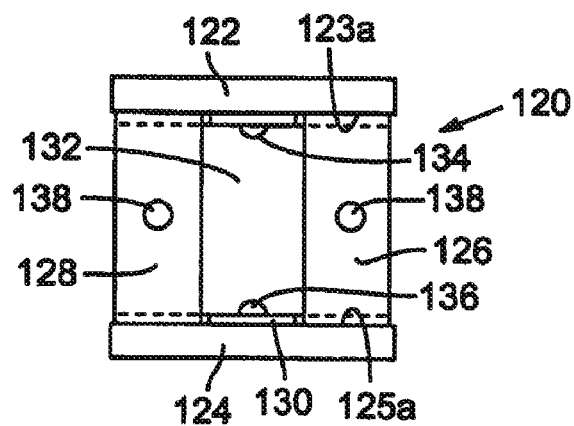
FIG. 1A is an end view of the roller bearing sub-assembly shown in FIG. 1, taken along line 1A-1A of FIG. 1.

FIG. 1 is a perspective view of a roller bearing sub-assembly according to a first embodiment of the invention. FIG. 1A is an end view of the roller bearing sub-assembly shown in FIG. 1, taken along line 1A-1A of FIG. 1.

Referring to FIGS. 1 and 1A, a roller bearing sub-assembly 120 includes mounting portions or rails (e.g., first mounting portion 122 and second mounting portion 124), straps (e.g., first peripheral strap 126, second peripheral strap 128 and central strap 130), a roller (e.g., roller 132), and attachments (e.g., first mounting portion attachments 134, second mounting portion attachments 136 and roller attachments 138).

The first mounting portion 122 includes a strap-supporting surface 123a and side surfaces 123b on opposite edges of the strap-supporting surface 123a. Likewise, the second mounting portion 124 includes a strap-supporting surface 125a and side surfaces 125b on opposite edges of the strap-supporting surface 125a. The strap-supporting surfaces 123a and 125a contact the straps 126, 128 and 130 as one or both of the mounting portions 122 and 124 move linearly along a selected direction (e.g., along direction indicated by arrow 140). The strap-supporting surfaces 123a and 125a are planar along the longitudinal direction of the straps (e.g., along the direction indicated by arrow 140), and are planar along a direction transverse to the longitudinal direction. The roller 132 is disposed between the strap-supporting surfaces 123a and 125a, and the straps 126, 128 and 130 are disposed between the roller 132 and the strap-supporting surfaces 123a and 125a.

A portion of the peripheral strap 126 and 128, and a portion of the central strap 130, (e.g., a first end thereof) are each secured to the first mounting portion 122 by a first mounting portion attachment 134. Likewise, another portion of the peripheral strap 126 and 128, and a portion of the central strap 130, (e.g., a second end thereof) are each secured to the second mounting portion 124 by a second mounting portion attachment 136.

In the illustrated embodiment, the first mounting portion attachments 134 and the second mounting attachments 136 secure the first and second ends of the peripheral straps 126 and 128 and the central strap 130 to the strap-supporting surface 123a of the first mounting portion 122 and to the strap-supporting surface 125a of the second mounting portion 124, respectively. It will be appreciated, however, that the first mounting portion attachments 134 can secure the first end of one or more of the straps 126, 128 and 130 to the side surfaces 123b of the first mounting portion 122. In such an embodiment, one or more of the peripheral straps 126 and 128 could extend onto at least a portion of one of the side surfaces 123b and the central strap 130 could extend onto at least a portion of the other of the side surfaces 123b. Likewise, the second mounting portion attachments 136 can secure one or more of the straps 126, 128 and 130 to the side surfaces 125b of the second mounting portion 124. In such an embodiment, one or more of the peripheral straps 126 and 128 could extend onto at least a portion of one of the side surfaces 125b and the central strap 130 could extend onto at least a portion of the other of the side surfaces 125b.

The straps 126, 128 and 130 are wrapped around different portions of the roller 132 to secure the roller 132 between the first mounting portion 122 and the second mounting portion 124. Ends of the first peripheral strap 126 extend away from the roller 132 in the same direction as ends of the second peripheral strap 128. Ends of the central strap 130 extend away from the roller 132 in the opposite direction as ends of the peripheral straps 126 and 128. The straps 126, 128 and 130 are spaced apart from each other along the axis of the roller 132 to reduce any contact wear between the straps experience during operation.

In the illustrated embodiment, a portion of each of the straps 126, 128 and 130 (e.g., a mid-point thereof) may be secured to the roller 132 by a roller attachment 138. It will be appreciated, however, that one or more of the straps 126, 128 and 130 may not be secured to the roller 132. For example, a portion of only the peripheral straps 126 and 128 may be secured to the roller 132 by a roller attachment 138, and the central strap 130 is not attached to the roller 132 by any roller attachment 138. In yet another embodiment, a portion of only the central strap 130 is secured to the roller 132 by a roller attachment 138, and the peripheral straps 126 and 128 are not attached to the roller 132 by any roller attachment 138.

In the illustrated embodiment, the roller 132 is cylindrical and roller attachments 138 are disposed at radially-opposite portions of the roller 138. As a result, each mounting portion 122 and 124 can move linearly along a selected direction (e.g., along direction indicated by arrow 140, which is perpendicular to the axis of the roller 132) for a distance equal to approximately half the circumference of the roller 132. To ensure that the maximum travel distance is attained, the length of the strap-supporting surfaces 123a and 125a (i.e., as measured in the longitudinal direction of the straps) should be at least half the circumference of the roller 132. In one embodiment, the length of the strap-supporting surfaces 123a and 125a can be greater than half the circumference of the roller 132 at least by an amount corresponding to the thickness of the straps 126, 128 and 130. Thus, the roller bearing sub-assembly 120 is configured such that each of the mounting portions 122 and 124 can move linearly along the selected direction 140 for a distance that is equal to approximately half the circumference of the roller 132. Therefore, the mounting portions 122 and 124 can move relative to each other along the selected direction 140 for a total distance that is approximately equal to half the circumference of the roller 132 in opposite directions from the mid-stroke position shown in FIG. 1.

The mounting portions are formed from a material that resists deformation (e.g., bending, compression, etc.) during operation of the roller bearing sub-assembly 120 when a load 143 is applied to the roller bearing sub-assembly 120. Exemplary materials for the mounting portions include carbon tool steels, stainless steels, beryllium copper, alumina, silicon nitride, glass, metal/ceramic composites and fiber reinforced plastics, or the like or a combination thereof. The first mounting portion 122 and the second mounting portion 124 can be formed from the same material or from different materials. The surfaces of one or more of the mounting portions may be treated to improve hardness, corrosion resistance, electrical and heat conductivity of the mounting portions. Such surface treatments may improve load capacity, bearing life, heat and/or electrical conductivity of the roller bearing sub-assembly 120. Exemplary surface treatments include heat treatments, chemical treatments, and physical coatings (e.g., chrome plating, titanium nitride, etc.). Surfaces of the first mounting portion 122 and the second mounting portion 124 can be treated with the same surface treatment or with different surface treatments.

The straps are formed of a suitably hard material that is also flexible during operation of the roller bearing sub-assembly 120. Exemplary materials for the straps include spring carbon steel, stainless steel, beryllium copper, titanium and longitudinally oriented ceramic fibers, optically transparent fibers (e.g., glass fibers) and composites of metal and/or longitudinally-oriented ceramic fibers, or the like or a combination thereof. The straps 126, 128 and 130 can be formed from the same material or from different materials. Similar to the mounting portions, the surfaces of one or more of the straps may be treated to improve hardness, corrosion resistance, electrical and heat conductivity of the straps. Surfaces of the straps 126, 128 and 130 can be treated with the same surface treatment or with different surface treatments.

The thickness and width of the straps 126, 128 and 130 is dependent upon numerous design factors including: physical and material properties (e.g., bending fatigue strength, compressive bearing strength, elastic modulus, hardness, conductivity, etc.) of the material from which the straps are formed, roller diameter and the resulting bending stress, frequency, travel velocity, and travel distance resulting in tensile stresses due to the roller's inertia, type and properties of the attachments used, and contact bearing stress due to load 143 acting between the roller 132 and straps 126, 128 and 130. When the roller 132 has a diameter in a range of about 25 mm to about 50 mm, each of the straps 126, 128 and 130 may have a thickness in a range of about 0.1 mm to about 0.5 mm. In one embodiment, when the roller 132 has a diameter of about 25 mm, each of the straps 126, 128 and 130 may have a thickness in a range of about 0.1 mm to about 0.2 mm when, for example, the load 143 is 40 kg. Each of the straps 126, 128 and 130 may have a width in a range of about 5 mm to about 20 mm. In one embodiment, the width of the central strap 130 is about twice the width of the peripheral straps 126, 128 so as to equalize longitudinal tensile stresses in each strap 126, 128 and 130.

The roller 132 is formed from a material that resists deformation (e.g., bending, compression, etc.) during operation of the roller bearing sub-assembly 120 when a load 143 is applied to the roller bearing sub-assembly 120. The roller 132 and any of the mounting portions can be formed from the same material or from different materials. Exemplary materials for the roller 132 include carbon tool steels, stainless steels, beryllium copper, alumina, silicon nitride, glass, and composites of metal, ceramic and/or epoxy, or the like or a combination thereof. The roller 132 can be configured as a hollow, essentially cylindrical roller. The roller material and the dimensions of the hollow roller 132 can be adjusted to provide a radial spring preload force that exceeds the radial load and thereby maintains contact between the mounting portions, straps, and roller 132 during operation of the roller bearing sub-assembly 120 for maximum bearing life and precision. As will be discussed in greater detail below, radial preloading of various components within a roller bearing sub-assembly may also be provided by adjustable mounting devices or interference fits with mating parts.

The diameter and length of the roller 132 is dependent upon the contact stress resulting from load 143 applied between the mounting portions 122 and 124, the strap 126, 128 and 130 and the roller 132. In one embodiment, the roller 132 can have a diameter in a range of about 25 mm to about 50 mm. In one embodiment, the length of the roller 132 is at least about 20 mm. In another embodiment, the length of the roller 132 is at least about 30 mm.

In one embodiment, the straps are formed of a metal material while the mounting portions and roller are formed of a ceramic material to prevent fretting corrosion between these components. In other embodiments, surface regions of the mounting portions, straps and roller that contact one another may be provided with surface coatings that can extend life by preventing the fretting corrosion or other types of physical degradation. Exemplary surface coatings include chrome plating, hard anodizing, heat treatments such as nitriding and flame hardening, ceramic coating, vapor depositions, diffusion treatments, and the like. When the roller bearing sub-assembly 120 is disposed within an inert operating environment or in a vacuum, surfaces of the mounting portions, straps, and roller may be coated with a dry lubricant such as molybdenum disulfide, graphite, or with a ceramic, an oxide, or any suitable plastic known in the art.

In the illustrated embodiment, the attachments 134, 136 and 138 are provided as pin, or the like, to permanently attach the various straps 126, 128 and 130 to various ones of the mounting portions 122 and 124 and the roller 132. However, any of the attachments 134, 136 and 138 may provide for permanent or temporary attachment of any of the straps 126, 128 and 138 to any of the mounting portions 122 and 124 and the roller 132. For example, any of the attachments may be provided as a fastener such as a rivet, screw, pin, or the like or a combination thereof. These fasteners can be retained semi-permanently using lock washers, adhesives, or the like or a combination thereof. In other embodiments, any of the attachments may be provided as adhesive material, solder material, brazing material, or the like or a combination thereof, which is located between any of the straps and the roller or between the any of the straps and any mounting portion. In another embodiment an attachment may be provided as a weld where any of the straps is welded to the roller or any of the mounting portions.

Constructed as described above, the roller bearing sub-assembly 120 permits linear motion of the first mounting portion 122 relative to the second mounting portion 124 only along the selected direction 140 while preventing the roller 132 from moving (e.g., via linear or rotational sliding) relative to the straps 126, 128 and 130. Thus, engagement of the roller 132 with the straps 126, 128 and 130 is constrained to rolling contact. As a result, insignificant wear or friction can result during operation of this bearing if the mounting portions 122 and 124, the straps 126, 128 and 130 and the roller 132 are fabricated from sufficiently hard materials. It will be appreciated that significantly improved bearing life can be achieved when the operating stress levels in one or more of the mounting portions, straps and roller are maintained below their respective fatigue/endurance limits. Further, precision dimensional manufacture of the rails, straps and roller, and accurate assembly of the roller bearing sub-assembly 120 can enhance the performance of the roller bearing sub-assembly 120.

FIG. 2 is a perspective view of a roller bearing sub-assembly according to a second embodiment of the invention.

Referring to FIG. 2, a roller bearing sub-assembly 220 according to a second embodiment includes mounting portions or rails (e.g., first mounting portion 222 and second mounting portion 224), straps (e.g., first peripheral straps 126a and 126b, second peripheral straps 128a and 128b and central straps 130a and 130b), rollers (e.g., rollers 132a and 132b), and attachments (e.g., first mounting portion attachments 134a and 134b, second mounting portion attachments 136a and 136b and roller attachments 138a and 138b).

The mounting portions, straps, and attachments may all be provided as exemplarily described with respect to the roller bearing sub-assembly 120 according to the first embodiment. However, in the roller bearing sub-assembly 220, each of the first peripheral straps 126a and 126b, second peripheral straps 128a and 128b and central straps 130a and 130b, are secured to the same first mounting portion 222 by a first mounting portion attachment 134a or 134b. Likewise, each of the first peripheral straps 126a and 126b, second peripheral straps 128a and 128b and central straps 130a and 130b, are secured to the same second mounting portion 224 by a second mounting portion attachment 136a or 136b.

In the illustrated embodiment, the roller bearing sub-assembly 220 is configured such that ends of the first peripheral straps 126a and 126b (as well as ends of the second peripheral straps 128a and 128b) are distant from each other and extend in opposite directions while ends of the central straps 130a and 130b are proximate to each other and extend in opposite directions. As a result, the ends of the peripheral straps 126a and 128a extend in the same direction as the end of the central strap 130b. Likewise, the ends of the peripheral straps 126b and 128b extend in the same direction as the end of the central strap 130a. In the illustrated embodiment, the central straps 130a and 130b are separate straps, but they may alternatively be provided as a single continuous loop strap.

It will be appreciated, however, that the roller bearing sub-assembly 220 may be configured in other ways. For example, the roller bearing sub-assembly 220 can be configured such that ends of the first peripheral straps 126a and 126b (as well as ends of the second peripheral straps 128a and 128b) are proximate to each other and extend in opposite directions while ends of the central straps 130a and 130b are distant from each other and extend in opposite directions. In such an example, the first peripheral straps 126a and 126 (as well as the second peripheral straps 128a and 128b) may be separate straps as shown, or they may be provided as a single continuous loop strap. In another example, the roller bearing sub-assembly 220 can be configured such that the ends of the peripheral straps 126a and 128a extend in the same direction as the ends of the peripheral straps 126b and 128b, and such that the end of the central strap 130a extends in the same direction as the end of the central strap 130b.

Constructed as described above, the roller bearing sub-assembly 220 provides a stable structure for supporting normally-directed loads such as a load indicated by arrow 143. In addition, the rollers 132a and 132b may help to maintain the first mounting portion 222 and the second mounting portion 224 in a substantially parallel relationship as the mounting portions 222 and 224 move linearly relative to each other along the selected direction 140.

FIG. 3 is a perspective view of a roller bearing sub-assembly according to a third embodiment of the invention.

Referring to FIG. 3, a roller bearing sub-assembly 320 according to a third embodiment includes mounting portions or rails (e.g., first mounting portions 122a and 122b and second mounting portions 124a and 124b), straps (e.g., first peripheral straps 126a and 126b, second peripheral straps 128a and 128b and central straps 130a and 130b), rollers (e.g., rollers 132a and 132b), attachments (e.g., first mounting portion attachments 134a and 134b, second mounting portion attachments 136a and 136b, roller attachments 138a and 138b, first spacer attachments 330a and 330b and second spacer attachments 328a and 328b) and mounting portion spacers or rail spacers (e.g., first mounting portion spacer 322 and second mounting portion spacer 324). The first spacer attachments 330a and 330b and second spacer attachments 328a and 328b may be provided as attachments such as those exemplarily described above with respect to the roller bearing sub-assemblies 120 or 220 of the first or second embodiments.

The mounting portions, straps, and attachments may all be provided as exemplarily described with respect to the roller bearing sub-assemblies 120 or 220 according to the first or second embodiments. However, in the roller bearing sub-assembly 320, the first mounting portion spacer 322 is secured between first mounting portions 122a and 122b and the second mounting portion spacer 324 is secured between second mounting portions 124a and 124b. The first spacer attachments 330a and 330b secure the first mounting portion spacer 322 to the first mounting portions 122a and 122b, respectively. Likewise, the second spacer attachments 328a and 328b secure the second mounting portion spacer 324 to the second mounting portions 124a and 124b, respectively.

In one embodiment, one or more of the mounting portion attachments 134a, 134b, 136a and 136b may optionally secure one or more of the mounting portions 122a, 122b, 124a and 124b to a mounting portion spacer or rail spacer. Accordingly, one or more of the mounting portion attachments 134a and 134b in the illustrated embodiment may not only secure a central strap 130a or 130b to a corresponding first mounting portion 122a or 122b, but may also secure a first mounting portion 122a or 122b to the first mounting portion spacer 322. Likewise, one or more of the mounting portion attachments 136a and 136b in the illustrated embodiment may not only secure a central strap 130a or 130b to a corresponding second mounting portion 124a or 124b, but may also secure a second mounting portion 124a or 124b to the second mounting portion spacer 324. It will be appreciated that the roller bearing sub-assembly 320 may be configured such that one or more (or all) mounting portion attachments secures a peripheral strap to a mounting portion may also secure a mounting portion to a mounting portion spacer.

Constructed as described above, the roller bearing sub-assembly 320 provides a stable structure for supporting normally-directed loads such as a load indicated by arrow 143. In addition, the rollers 132a and 132b may help to maintain the first mounting portions 122a and 122b and the second mounting portions 124a and 124b in a substantially parallel relationship as they move linearly relative to each other along the selected direction 140. Lastly, the width of the mounting portion spacers 322 and 324 can be selected to create a space within the roller bearing sub-assembly 320 (e.g., between the first mounting portions and the second mounting portions sized sufficiently to receive a device.

Figure 4:
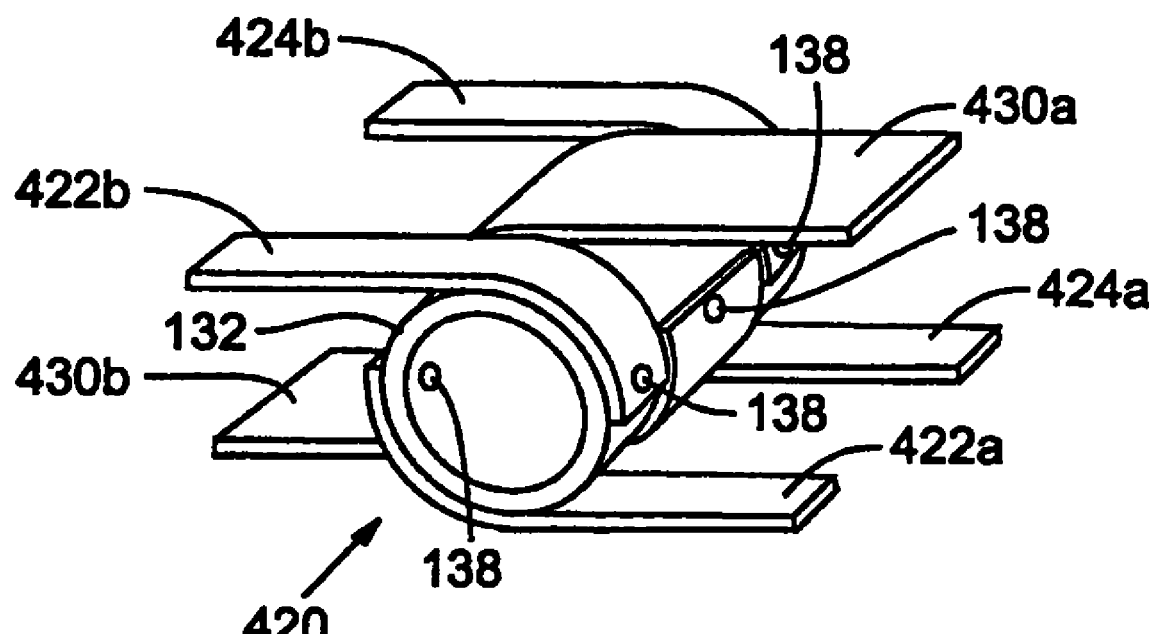
FIG. 4 is a perspective view of a partially-constructed roller bearing sub-assembly according to a fourth embodiment of the invention.

FIG. 4 is a perspective view of a partially-constructed roller bearing sub-assembly according to a fourth embodiment of the invention.

Referring to FIG. 4, roller bearing sub-assembly 420 includes straps (e.g., a first pair of complementary peripheral straps 422a and 422b, a second pair of complementary peripheral straps 424a and 424b and a pair of complementary central straps 130a and 130b), a roller (e.g., roller 132), and attachments (e.g., roller attachments 138).

The straps, roller and attachments may all be provided as exemplarily described with respect to the roller bearing sub-assemblies 120, 220 or 320 according to the first, second or third embodiments. However, the straps in the roller bearing sub-assembly 420 are provided such that each pair of complementary straps are partially wrapped around radially-opposite portions of the roller 132. Further, the straps are provided such that ends of straps within each pair of complementary straps are disposed at opposite sides of the roller 132 along a longitudinal axis of the roller 132. In the roller bearing sub-assembly 420, each of the straps should be secured to the roller 132 (e.g., by roller attachments 138).

Although not shown, the roller bearing sub-assembly 420 may further include mounting portions and other attachments such as first mounting portion attachments 134, second mounting portion attachments 136, all of which may be provided as exemplarily described above with respect to the roller bearing sub-assemblies 120, 220 or 320 of the first, second, or third embodiments.

Figure 5:
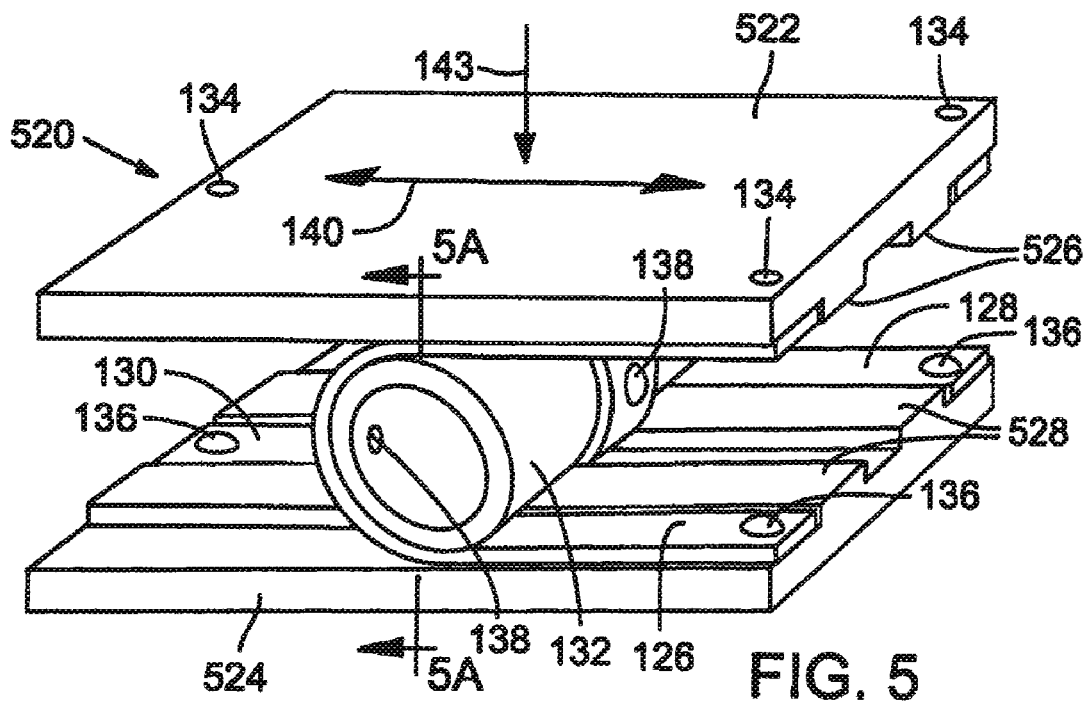
FIG. 5 is a perspective view of a roller bearing sub-assembly according to a fifth embodiment of the invention.
Figure 5A:
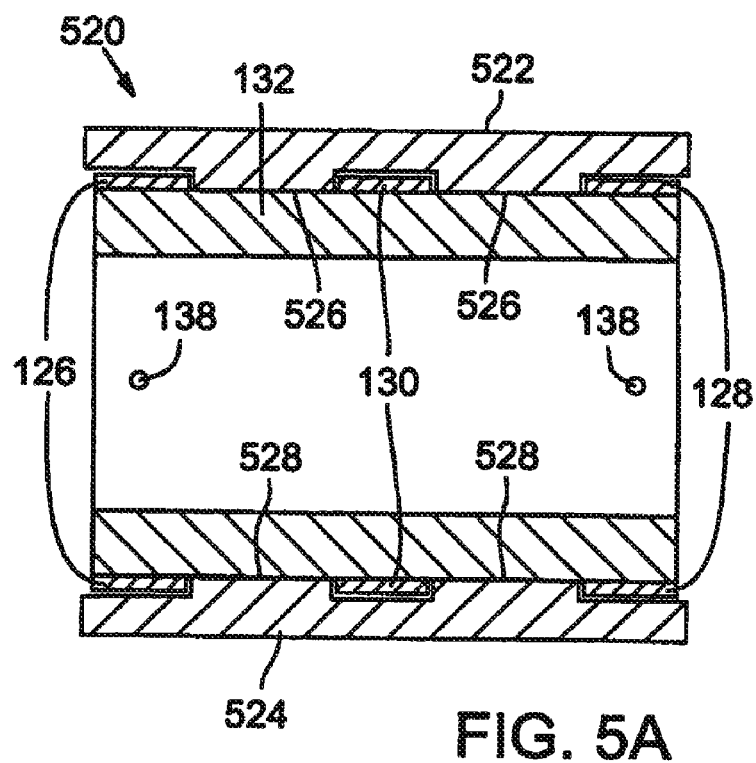
FIG. 5A is a cross-sectional view of the roller bearing sub-assembly shown in FIG. 5, taken along line 5A-5A of FIG. 5.

FIG. 5 is a perspective view of a roller bearing sub-assembly according to a fifth embodiment of the invention. FIG. 5A is a cross-sectional view of the roller bearing sub-assembly shown in FIG. 5, taken along line 5A-5A of FIG. 5.

Referring to FIGS. 5 and 5A, a roller bearing sub-assembly 520 according to a fifth embodiment includes mounting portions or rails (e.g., first mounting portion 522 and second mounting portion 524), straps (e.g., first peripheral strap 126, second peripheral strap 128 and central strap 130), a roller (e.g., roller 132), and attachments (e.g., first mounting portion attachments 134, second mounting portion attachments 136 and roller attachments 138).

The first mounting portion 522 is similar to the first mounting portion 122, but includes first support ribs 526 extending between the straps 126, 128 and 130 to contact the roller 132. Likewise, the second mounting portion 524 is similar to the second mounting portion 124, but includes second support ribs 528 extending between the straps 126, 128 and 130 to contact the roller 132. The support ribs 526 and 528 extend along the selected direction 140. In one embodiment, the height of the support ribs 526 and 528 is greater than the thickness of the straps 126, 128 and 130.

In one embodiment, the height of the support ribs 526 and 528 is in a range of about 0 mm to about 0.2 mm greater than the maximum thickness tolerance of the straps 126, 128 and 130. The width of the support ribs 526 and 528 is dependent upon the contact stress induced by load 143. In one embodiment, the width of the support ribs 526 and 528 is at least about 25 mm. In another embodiment, the width of the support ribs 526 and 528 is at least about 50 mm.

In the illustrated embodiment, each of the support ribs 526 and 528 and respective ones of the mounting portions 522 and 524 constitute a single, monolithic piece. In other embodiments, however, one or both of the support ribs 526 and 528 may be provided as a separate piece or layer that is attached to or deposited on a corresponding one of the mounting portions 522 and 524.

In the illustrated embodiment, each of the support ribs 526 and 528 extend from respective ones of the mounting portions 522 and 524. In another embodiment, however, the support ribs 526 and 528 may be replaced with a corresponding number of ribs extending circumferentially around the roller 132 and located between the portions of the straps 126, 128 and 130 that are wrapped around the roller 132. In yet another embodiment, the roller bearing sub-assembly 520 may include one or both of the support ribs 526 and 528 in addition to one or more ribs extending circumferentially around the roller 132.

In the illustrated embodiment, the straps 126, 128 and 130 of the roller bearing sub-assembly 520 are configured as exemplarily described with respect to the straps 126, 128 and 130 of the roller bearing sub-assemblies 120, 220 and 320. In other embodiments, however, the straps 126, 128 and 130 of the roller bearing sub-assembly 520 may be configured as exemplarily described with respect to straps 422a, 422b, 424a, 424b, 430a and 430b of the roller bearing sub-assembly 420.

Constructed as described above, the roller bearing sub-assembly 520 can provide for increased lateral precision since variations in the thickness of the straps 126, 128 and 130 will not affect the rolling motion of the roller 132. Reduced load capacity may result from the reduced roller bearing area. However, by ensuring that one or more of the straps 126, 128 and 130 is sufficiently narrow, adequate contact area between the roller 132 and the support ribs 526 and 528 can be provided to maintain adequate load capacity.

Linear Roller-Bearing Assembly

Figure 6:
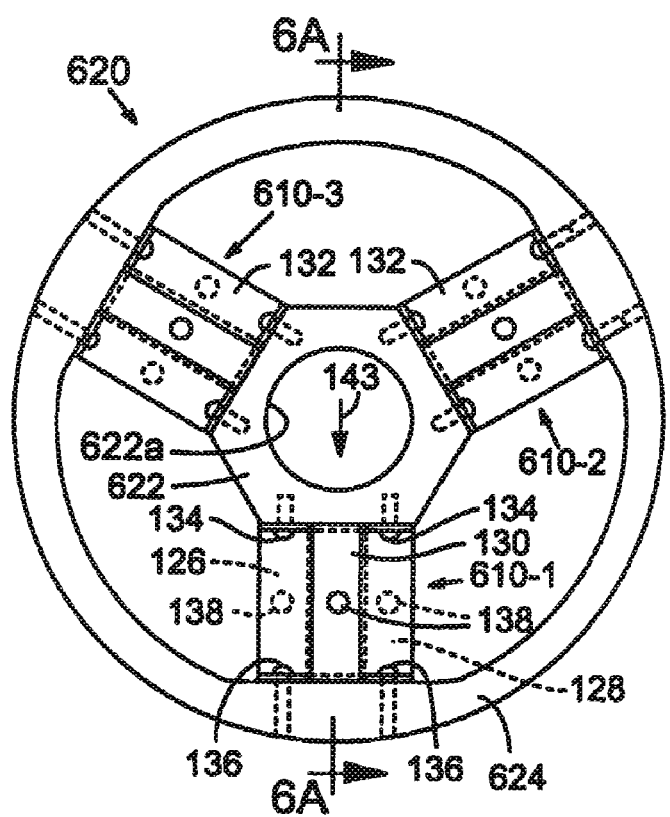
FIG. 6 is an end view of a linear roller bearing assembly according to a sixth embodiment of the invention.
Figure 6A:
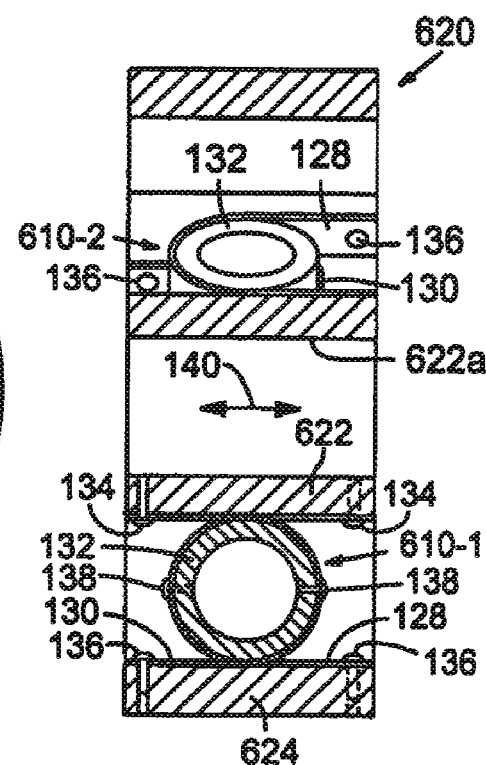
FIG. 6A is a cross-sectional view of the linear roller bearing assembly shown in FIG. 6, taken along line 6A-6A of FIG. 6.

FIG. 6 is an end view of a linear roller bearing assembly according to a sixth embodiment of the invention. FIG. 6A is a cross-sectional view of the linear roller bearing assembly shown in FIG. 6, taken along line 6A-6A of FIG. 6.

Referring to FIGS. 6 and 6A, a linear roller bearing assembly 620 according to a sixth embodiment includes roller bearing sub-assemblies (e.g., first roller bearing sub-assembly 610-1, second roller bearing sub-assembly 610-2, and third roller bearing sub-assembly 610-3, each generically referred to herein as a "roller bearing sub-assembly 610"), a hub (e.g., hub 622) and a collar (e.g., collar 624).

The roller bearing sub-assemblies 610 are spaced apart from each other at a regular interval around the hub 622. Each of the roller bearing sub-assemblies 610 is provided as exemplarily described with respect to FIG. 1. For example, each of the roller bearing sub-assemblies 610 may include peripheral straps 126 and 128, a central strap 130, a roller 132 secured to the straps 126, 128 and 130 by roller attachments 138. Within each of the roller bearing sub-assemblies 610, first ends of the straps 126, 128 and 130 are secured to a portion of the hub 622 (i.e., a "mounting portion of the hub 622") by first mounting portion attachments 134 and second ends of the straps 126, 128 and 130 are each secured to a portion of the collar (i.e., a "mounting portion of the collar 624"). Thus, the mounting portion of the hub 622 can correspond to the first mounting portion 122 described above with respect to the first embodiment, and form a part of a roller bearing sub-assembly 610. Likewise, the mounting portion of the collar 624 can correspond to the second mounting portion 124 described above with respect to the first embodiment, and form a part of a roller bearing sub-assembly 610. As exemplarily illustrated, the mounting portions of the hub 622 and collar 624 define surfaces that are substantially planar. Accordingly, surfaces defined by the mounting portions of the hub 622 and collar 624 correspond to the strap-supporting surfaces 123a and 125a described above with respect to the first embodiment.

Although the roller bearing sub-assemblies 610 are described above as being provided as described with respect to FIG. 1, it will be appreciated that each of the roller bearing sub-assemblies 610 can be provided as any type of roller bearing sub-assembly described herein.

In the illustrated embodiment, the thickness of each of the straps 126, 128 and 130 within the same roller bearing sub-assembly 610 is the same. Moreover, the thickness of each of the straps 126, 128 and 130 of different roller-bearing sub-assemblies 610 is the same. When each of the straps 126, 128 and 130 of different roller-bearing sub-assemblies 610 is the same, the axis of the hub 622 is aligned with the axis of the collar 624. Because the hub 622 and collar 624 are moveably coupled to each other via the roller-bearing sub-assemblies 610, an axis of the hub 622 can be radially positioned with respect to an axis of the collar 624 by ensuring that the thickness of the straps 126, 128 and 130 in each of the roller-bearing sub-assemblies 610 is different from the thickness of the straps 126, 128 and 130 in every other roller bearing sub-assembly 610. In another embodiment, the width of the straps 126, 128 and 130 in one of the roller-bearing sub-assemblies 610 can be made different from the thickness of the straps 126, 128 and 130 in at least one other roller bearing sub-assembly 610 to compensate, for example, for differences in loads experienced between the various roller-bearing sub-assemblies 610, for a particular orientation of the linear roller bearing assembly relative to a gravitational, electrical or magnetic field, or the like or a combination thereof.

Although the linear roller bearing assembly 620 has been described above as including only three roller bearing sub-assemblies 610 disposed in a radial pattern around the hub 622, it will be appreciated that the linear roller bearing assembly 620 can include more than three roller bearing sub-assemblies disposed in a radial pattern around the hub 622. Further, increasing the number of roller bearing sub-assemblies may increase the load capacity under which the linear roller bearing assembly 620 can suitably operate.

The hub 622 may be configured to be coupled to a moveable component (e.g., a piston, etc.) of a machine (e.g., a Stirling engine, a cryocooler, a pump, a refrigerator, etc.). In the illustrated embodiment, the hub 622 is lighter than the collar 624 and includes a central bore or cavity 622a, which can be used to further minimize the weight of the hub 622 and increase the resonant natural frequency with which the hub 622 can be moved linearly along the selected direction 140. In one embodiment, the moveable component of the machine may be coupled to the hub 622 by being threadedly engaged with the central bore 622a of the hub 622. In other embodiments, however, the hub 622 may be coupled to an immovable component of a machine and the collar 624 can be moveable along the selected direction 140.

The collar 624 is disposed around the hub 622 and the roller bearing sub-assemblies 610 are disposed in a radial pattern around the hub 622. The collar 624 may be configured to be coupled to an immoveable component (e.g., a housing, a mounting point) of a machine (e.g., a Stirling engine, a cryocooler, a pump, etc.). The immoveable component of the machine may be coupled to the collar 624 by any suitable method. In other embodiments, however, the collar 624 may be coupled to a movable component of a machine when, for example, the hub 622 is coupled to an immovable component of the machine.

In one embodiment, within at least one of the roller bearing sub-assemblies 610, the rollers and mounting portions are formed of electrically insulating material(s) and one or more of the straps is formed of an electrically conductive material (e.g., beryllium copper alloy) suitable for transmitting one or more types of electrical current (e.g., voltage, polarity, phase, wave shape, etc.). In this embodiment, the mounting portion attachments 134 and 136 may also be formed of an electrically conductive material. The electrically conductive strap, and the optional electrically conductive first mounting portion attachment 134 and/or second mounting portion attachment 136 which contact the electrically conductive strap, forms an electrical connector. Wires and/or components within a machine may be electrically connected together by the electrical connector. Thus, at least one of the roller bearing sub-assemblies 610 may include at least one electrical connector configured to transmit signals, power, or the like or a combination thereof, outside the roller bearing sub-assembly 610 (e.g., to wires and/or components within a machine that incorporates the linear roller bearing assembly 620) and conduct the electric current to a moving device (e.g., an armature, a transducer, a sensor, or the like or a combination thereof).

In the illustrated embodiment, each of the hub 622 and the collar 624 constitute a single, monolithic piece. In other embodiments, however, the hub 622 and the collar 624 may each be formed from multiple pieces. The hub 622 and collar 624 may be formed from the same material(s) as described above with respect to the first mounting portion 122 and 124.

Constructed as described above, the linear roller bearing assembly 620 can stably support loads in both radial and torsional directions.

Figures 7, 7A:
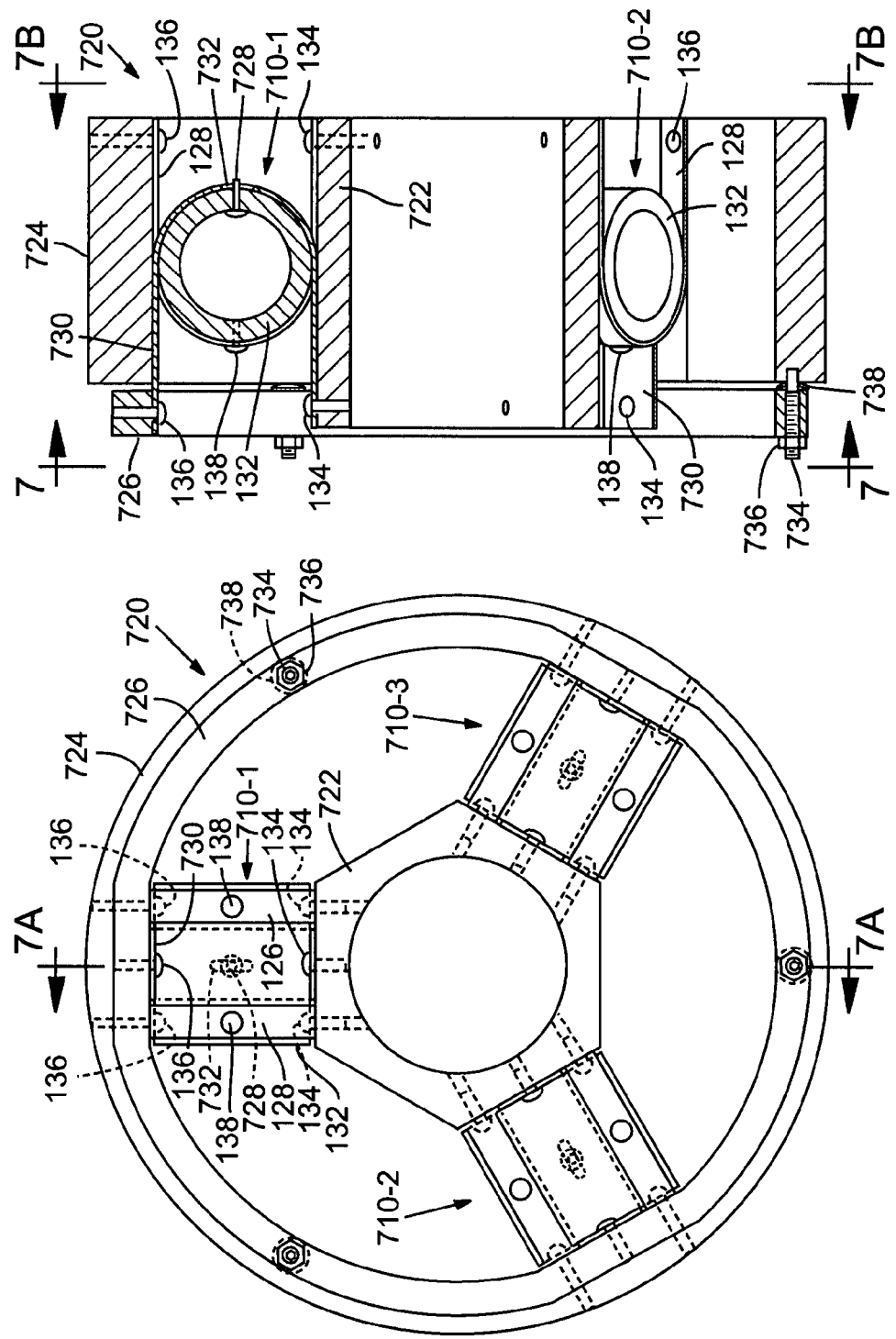
FIG. 7 is an end view of a linear roller bearing assembly according to a seventh embodiment of the invention.
FIG. 7A is a cross-sectional view of the linear roller bearing assembly shown in FIG. 7, taken along line 7A-7A of FIG. 7.
Figure 7B:
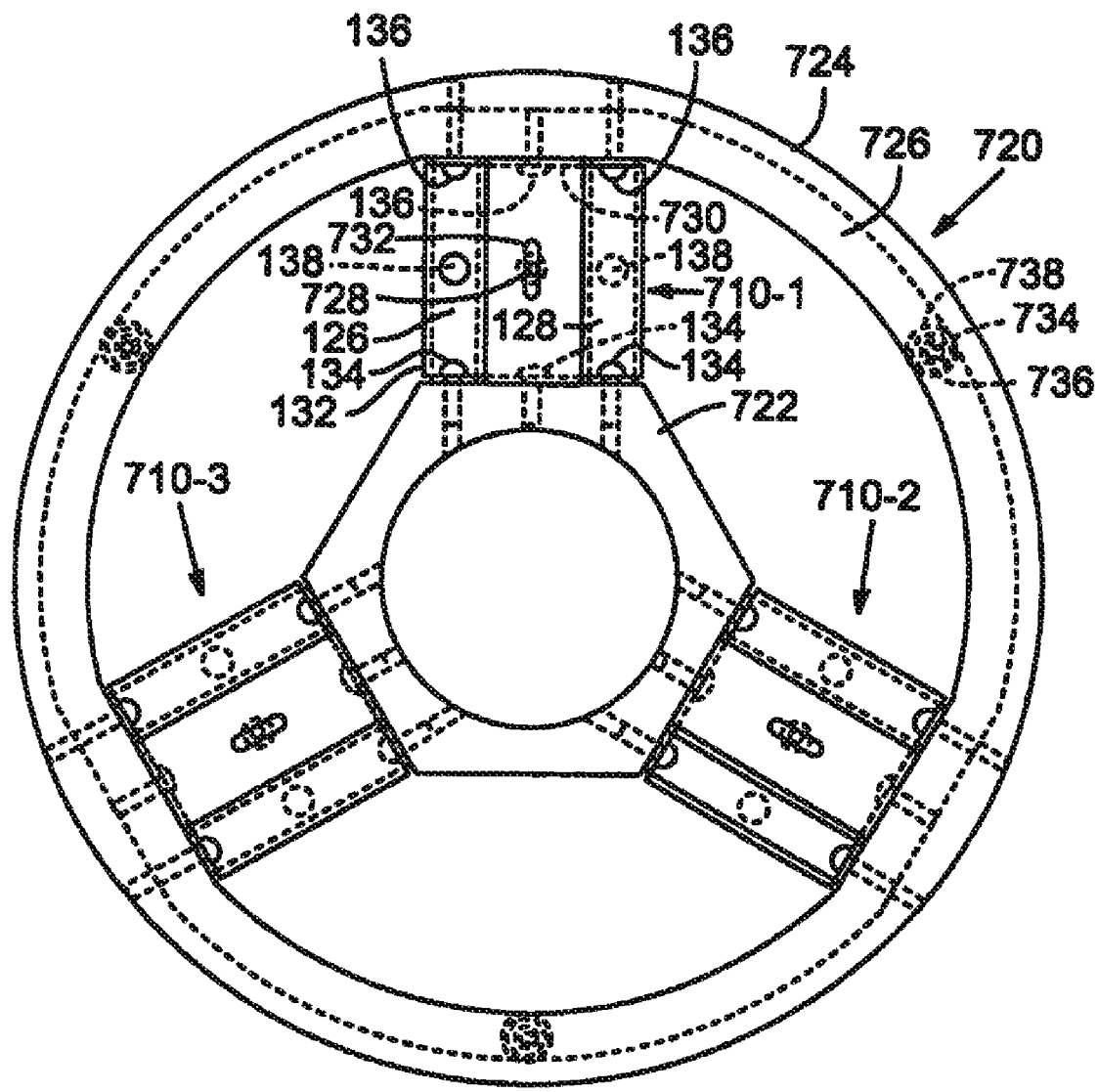
FIG. 7B is an end view of the linear roller bearing assembly shown in FIG. 7, taken along line 7B-7B of FIG. 7A.

FIG. 7 is an end view of a linear roller bearing assembly according to a seventh embodiment of the invention. FIG. 7A is a cross-sectional view of the linear roller bearing assembly shown in FIG. 7, taken along line 7A-7A of FIG. 7. FIG. 7B is an end view of the linear roller bearing assembly shown in FIG. 7, taken along line 7B-7B of FIG. 7A.

Referring to FIGS. 7, 7A and 7B, a linear roller bearing assembly 720 according to a seventh embodiment includes a roller bearing sub-assemblies (e.g., first roller bearing sub-assembly 710-1, second roller bearing sub-assembly 710-2, and third roller bearing sub-assembly 710-3, each generically referred to herein as a "roller bearing sub-assembly 710"), a hub (e.g., hub 722), a collar (e.g., collar 724), a tensioning device (e.g., including a tensioning ring 726 and adjustable attachment devices each including a screw 734, a lock nut 736, and a spring washer 738).

The roller bearing sub-assemblies 710 may be provided as exemplarily described above with respect to the sixth embodiment. However, in the illustrated embodiment, the second end of the central strap 730 of each of the roller bearing sub-assemblies 710 is secured to the tensioning device 726 by the attachment 136 instead of to the collar 724. Additionally in the illustrated embodiment, the central strap 730 of each of the roller bearing sub-assemblies 710 is not fixedly attached to the roller 132. Rather, the central strap 730 includes a slot 732 extending circumferentially around the roller 132 and a pin 728 extends from a surface of the roller 132 through the longitudinal slot 732. Constructed as described above, the pin 728 extending through the slot 732 of the central strap 730 enables the central strap 730 to slide circumferentially across the surface of the roller 132 when, for example, the tensioning device 726 is moved relative to the collar 724. Thus, the central strap 730 can be circumferentially free of the roller 132.

The tensioning ring 726 is a substantially rigid structure that is moveably coupled to the collar 724 via the adjustable attachment devices. In the illustrated embodiment, each adjustable attachment device includes a screw 734, a lock nut 736 and a spring washer 738. The screw 734 threadedly engages with the inner surface of a bore extending through the tensioning ring 726, and also extends into a recess formed in an end surface of the collar 724. The lock nut 736 is threadedly coupled to the screw 734 and is disposed on one side of the tensioning ring 726. The spring washer 738 is disposed between the tensioning ring 726 and the end surface of the collar 724. The spring washer 738 biases the tensioning ring 726 away from the end surface of the collar 724 while the lock nut 736 locks the screw 734 from turning within the tensioning ring 726. In one embodiment, the spring washer 738 may be omitted.

Constructed as described above, tension within the central strap 730 of each of the roller bearing sub-assemblies 710 can be adjusted by threading the screw 734 toward the end surface of the collar 724, resulting in an increase of tension within the central straps 730, or by threading the screw 734 away from the end surface of the collar 724, resulting in the spring washer 738 providing a relatively constant tensioning within the central straps 730. The lock nut 736 is used to lock the screw 734 after tension within the strap 730 is adjusted. When the tensioning device tensions the center strap 730, the peripheral straps 842 and 844 are also tensioned by virtue of the slippage allowed by the slot 732. The pins 728, which extend through the slots 732 of the central straps 730, can minimize or prevent travel of the central straps 730 along the longitudinal axis of the roller 132. It will be appreciated, however, that the pin 728 and slot 732 may be omitted from in one or more or all of the roller bearing sub-assemblies 710.

The hub 722 and collar 724 may be configured in a similar manner as described above with respect to the hub 622 and collar 624.

FIG. 8 is an end view of a linear roller bearing assembly according to an eighth embodiment of the invention. FIG. 8A is a cross-sectional view of the linear roller bearing assembly shown in FIG. 8, taken along line 8A-8A of FIG. 8.

Referring to FIGS. 8 and 8A, a linear roller bearing assembly 820 according to an eighth embodiment includes roller bearing sub-assemblies (e.g., first roller bearing sub-assembly 810-1, second roller bearing sub-assembly 810-2, third roller bearing sub-assembly 810-3, fourth roller bearing sub-assembly 810-4, fifth roller bearing sub-assembly 810-5, and a sixth roller bearing sub-assembly 810-6, each generically referred to herein as a "roller bearing sub-assembly 810"), a hub (e.g., hub 822), a collar (e.g., collar 824), tensioning device (e.g., including a tensioning ring 826 and adjustable attachment devices, each including a pin 828 and a coil spring 830), hub attachments (e.g., hub attachments 836), collar attachments (e.g., collar attachments 838) and straps (e.g., first peripheral strap 842, second peripheral strap 844, central straps 130 and 730). Also shown in FIGS. 8 and 8A are mounting portions (e.g., first mounting portions 832 and second mounting portions 834).

The roller bearing sub-assemblies 810 may be provided in a manner similar to that exemplarily described with respect to the second embodiment. However in the illustrated embodiment, each roller bearing sub-assembly 810 includes a first peripheral strap 842 and a second peripheral strap 844 each provided as a continuous loop that is wrapped around rollers 132a and 132b and attached to the rollers 132a and 132b with the attachments 138a and 138b, respectively. With this configuration, the peripheral straps 842 and 844 need not be secured to any portion of the hub 822 or collar 824 by any mounting portion attachments. Rather, within each roller bearing sub-assembly 810, first ends of the central straps 730 and 130 are secured to the first mounting portion 832 by first mounting portion attachments 134a and 134b, respectively. Likewise, second ends of the central straps 730 and 130 are secured to the tensioning ring 826 and the second mounting portion 834, respectively, by second mounting portion attachments 136a and 136b, respectively. The first mounting portion 832 is coupled to the hub 822 by one or more hub attachments 836 and the second mounting portion 834 is coupled to the collar 824 by one or more collar attachments 838. Consequently, the central straps 730 and 130 of each roller bearing sub-assembly 810 can be connected to either the hub 822 or the collar 824 via a first mounting portion 832 or a second mounting portion 834.

The hub attachments 836 and collar attachments 838 may be provided as exemplarily described with respect to the attachments 134, 136 and 138. In one embodiment, hub attachments 836 (e.g., pins) are inserted into apertures formed in the hub 822 and the first mounting portions 832 to couple the hub 822 and first mounting portions 832 together. Likewise, collar attachments 838 (e.g., pins) are inserted into apertures formed in the hub collar 834 and second mounting portions 834 to couple the hub 822 and second mounting portions 834 together. An adhesive material such as epoxy may be provided to fix the hub attachments 836 and collar attachments 838 within their respective apertures. Once inserted into an aperture, each hub attachment 836 prevents a corresponding first mounting portion 832 from sliding relative to the hub 822 (e.g., along the direction of the axis of the hub 822 and collar 824). Likewise, once inserted into an aperture, each collar attachment 838 prevents a corresponding second mounting portion 834 from sliding relative to the hub collar 824 (e.g., along the direction of the axis of the hub 822 and collar 824).

Constructed as exemplarily described above, the roller bearing sub-assemblies 810 support the hub 822 and precisely guide relative motion between the hub 822 and the collar 824 so that gaps 840 between the hub 822 and collar 824 are maintained even as the hub 822 and collar 824 move relative to each other along a linear direction.

As exemplarily illustrated, the central strap 730 of each roller bearing sub-assembly 810 is configured as exemplarily described above with respect to the seventh embodiment. Pin 728 may also be provided to extend from the surface of the roller 132a through a slot 732 formed in the central strap 730. Constructed as described above, the pin 728 extending through the slot 732 of the central strap 730 enables the central strap 730 to slide across the surface of the roller 132a when, for example, the tensioning ring 826 is moved relative to the collar 824.

Although the roller bearing sub-assemblies 810 are described above as being provided in a similar manner as described with respect to the second embodiment, it will be appreciated that each of the roller bearing sub-assemblies 810 can be provided as any type of roller bearing sub-assembly described herein.

Although the linear roller bearing assembly 820 has been described above as including six roller bearing sub-assemblies 810 disposed in a radial pattern around the hub 822, it will be appreciated that the linear roller bearing assembly 820 can include three or more roller bearing sub-assemblies disposed in a radial pattern around the hub 822. Further, decreasing the number of roller bearing sub-assemblies may advantageously reduce the weight of the linear roller bearing assembly 820. In one embodiment, one or more roller bearing sub-assemblies 810 may be removed from locations that are not supporting preferential loading in one radial direction due to the presence of a gravitational, electrical or magnetic field, or the like or a combination thereof.

Similar to the tensioning device described above with respect to the seventh embodiment, the tensioning ring 826 is a substantially rigid structure that is moveably coupled to the collar 824 via tensioning attachment devices. In the illustrated embodiment, each adjustable attachment device includes a pin 828 and a coil spring 830. The pin 828 is fixedly coupled to the collar 824, and also extends into a clearance bore formed through the tensioning ring 826. The compressed coil spring 830 is disposed within the recess formed in the end surface of the collar 824 and biases the tensioning ring 826 away from the end surface of the collar 824, thereby ensuring that the central straps 730 of the roller bearing sub-assemblies 810 are maintained in a predetermined level of tension.

The hub 822 and collar 824 may be configured in a similar manner as described above with respect to the hub 622 and collar 624.

Figure 9:
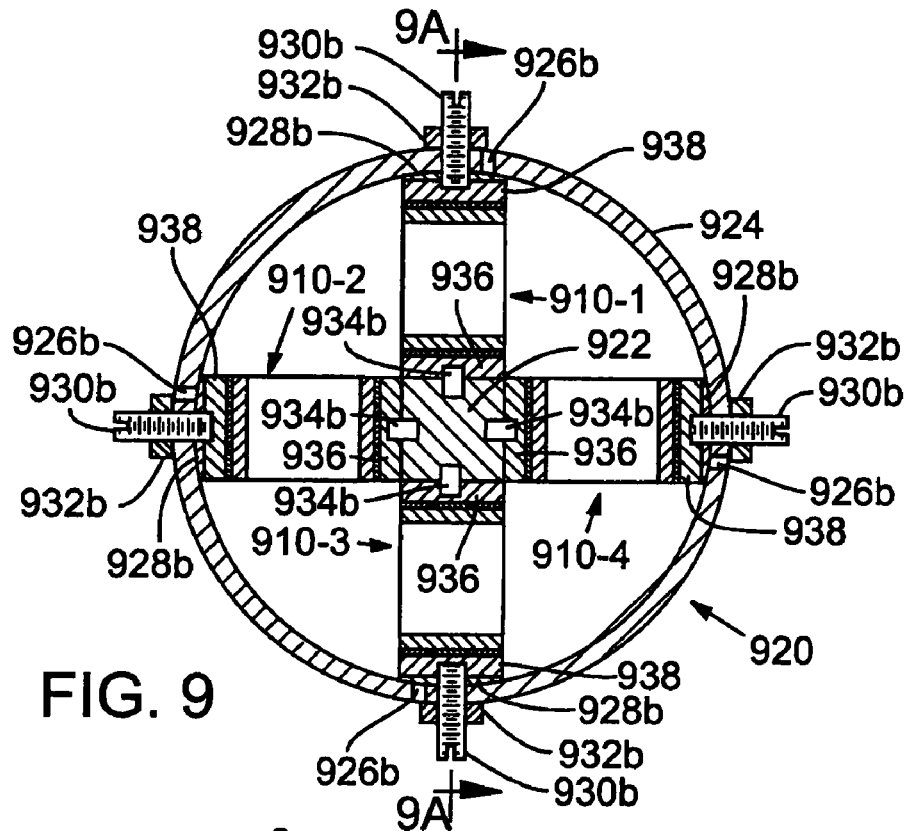
FIG. 9 is a cross-sectional view of a linear roller bearing assembly according to a ninth embodiment of the invention.
Figure 9A:
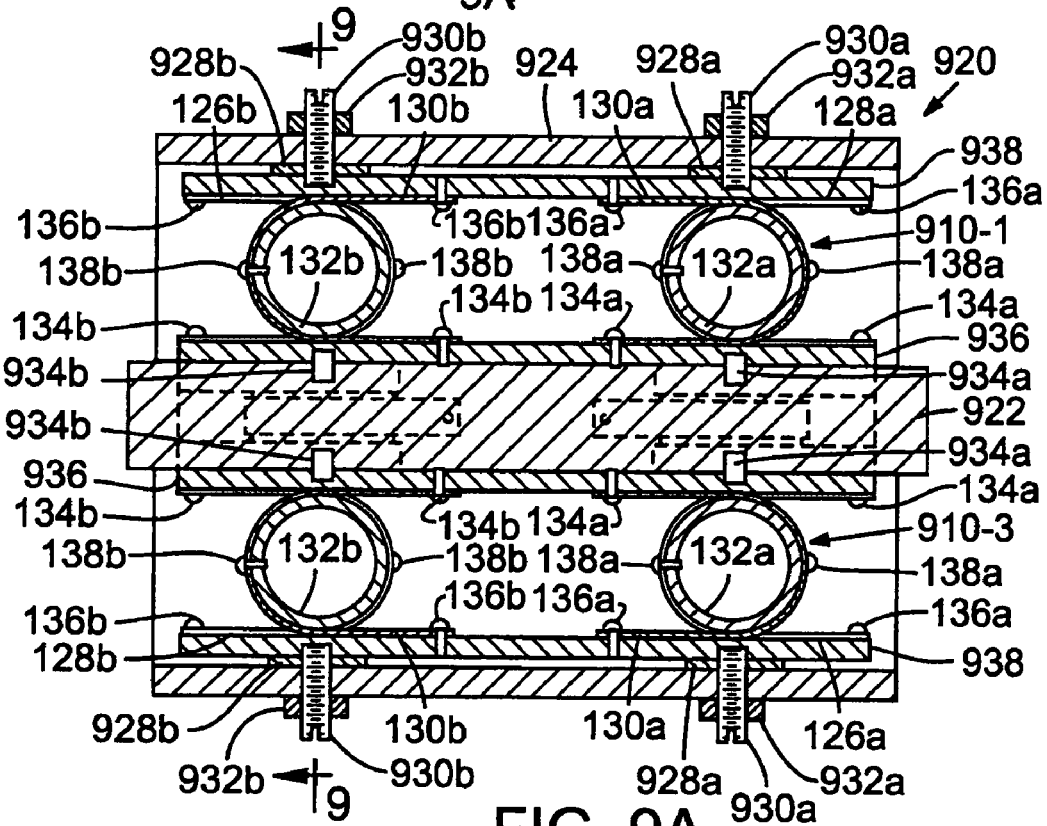
FIG. 9A is a cross-sectional view of the linear roller bearing assembly shown in FIG. 9, taken along line 9A-9A of FIG. 9.

FIG. 9 is a cross-sectional view of a linear roller bearing assembly according to a ninth embodiment of the invention. FIG. 9A is a cross-sectional view of the linear roller bearing assembly shown in FIG. 9, taken along line 9A-9A of FIG. 9.

Referring to FIGS. 9 and 9A, a linear roller bearing assembly 920 according to a ninth embodiment includes roller bearing sub-assemblies (e.g., first roller bearing sub-assembly 910-1, second roller bearing sub-assembly 910-2, third roller bearing sub-assembly 910-3 and fourth roller bearing sub-assembly 910-4, each generically referred to herein as a "roller bearing sub-assembly 910"), a hub (e.g., hub 922), a collar (e.g., collar 924), fixing devices (e.g., first fixing devices, each including a first screw 930a, a first nut 932a, a first access hole (not shown) and first fixing material 928a, and second fixing devices, each including a second screw 930b, a corresponding second nut 932b, a second access hole 926b and second fixing material 928b), hub attachments (e.g., first hub attachments 934a and second hub attachments 934b). Also shown in FIGS. 9 and 9A are mounting portions (e.g., first mounting portions 936 and second mounting portions 938).

The roller bearing sub-assemblies 910 may be provided as exemplarily described with respect to the second embodiment. For example, within each roller bearing sub-assembly 910, first ends of the first peripheral straps 126a and 126b, second peripheral straps 128a and 128b, and central straps 130a and 130b are secured to a first mounting portion 936 by first mounting portion attachments 134a and 134b. Likewise, second ends of the first peripheral straps 126a and 126b, second peripheral straps 128a and 128b, and central straps 130a and 130b are secured to a second mounting portion 938 by second mounting portion attachments 136a and 136b. The first mounting portion 936 is coupled to the hub 922 by one or more first hub attachments 934a and one or more second hub attachments 934b and the second mounting portion 938 is coupled to the collar 924 by one or more first fixing devices and one or more second fixing devices. Consequently, the straps 126a, 126b, 128a, 128b, 130a and 130b of each roller bearing sub-assembly 910 can be connected to either the hub 922 or the collar 924 via a first mounting portion 936 or a second mounting portion 938.

The hub attachments 934a and 934b may be configured in a similar manner as described above with respect to the hub attachments 836. Likewise, the hub 922 and the first mounting portions 936 may be configured in a similar manner as described above with respect to the eighth embodiment to ensure that the hub 922 and the first mounting portions 936 are adequately secured to each other.

In the illustrated embodiment, the first screw 930a of each first fixing device threadedly engages with the inner surface of a bore extending through the collar 924, and also extends into a recess formed in the second mounting portion 938. The first nut 932a threadedly engages with first screw 930a and can be tightened against an outer surface of the collar 924. The first fixing material 928a may be injected into a space formed between the collar 924 and the second mounting portion 938 through the first access hole. Likewise, the second screw 930b of each second fixing device threadedly engages with the inner surface of a bore extending through the collar 924, and also extends into a recess formed in the second mounting portion 938. The second nut 932b threadedly engages with second screw 930b and can be tightened against the outer surface of the collar 924. The second fixing material 928b may be injected into the space formed between the collar 924 and the second mounting portion 938 through the second access hole 926b. The first fixing material 928a and second fixing material 928b may be an adhesive material such as an epoxy. It will be appreciated however, that the first fixing material 928a and the second fixing material 928b may be omitted, as may the first access hole and the second access hole 926b.

Although FIGS. 9 and 9A illustrate recesses formed in the second mounting portion 938 that receive the first and second screws 930a and 930b, it will be appreciated that the recesses may be omitted. Further, although FIGS. 9 and 9A illustrate wherein the length and width of the recess in the second mounting portion 938 is equal to the diameter of the first and second screws 930a and 930b, it will be appreciated that the length and width of the recess in the second mounting portion 938 may be greater than the diameter of the first and second screws 930a and 930b. Accordingly, the axis of the hub 922 can be radially positioned with respect to the axis of the collar 924 by, for example, adjusting the amount by which the screws 930a and 930b extend through the collar 924. Although not illustrated, shim washers may be provided between the collar 924 and one or more of the mounting portions.

Although the roller bearing sub-assemblies 910 are described above as being provided as described with respect to the second embodiment, it will be appreciated that each of the roller bearing sub-assemblies 910 can be provided as any type of roller bearing sub-assembly described herein.

Although the linear roller bearing assembly 920 has been described above as including four roller bearing sub-assemblies 910 disposed in a radial pattern around the hub 922, it will be appreciated that the linear roller bearing assembly 920 can include three or more roller bearing sub-assemblies disposed in a radial pattern around the hub 922.

The hub 922 and collar 924 may be configured in a similar manner as described above with respect to the hub 622 and collar 624.

Figure 10:
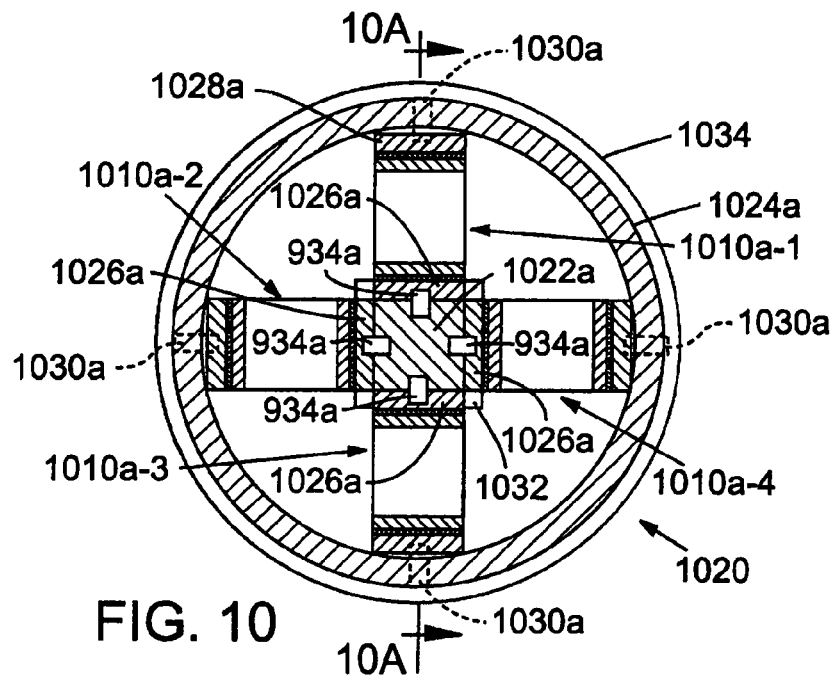
FIG. 10 is a cross-sectional of a linear roller bearing assembly according to a tenth embodiment of the invention.
Figure 10A:
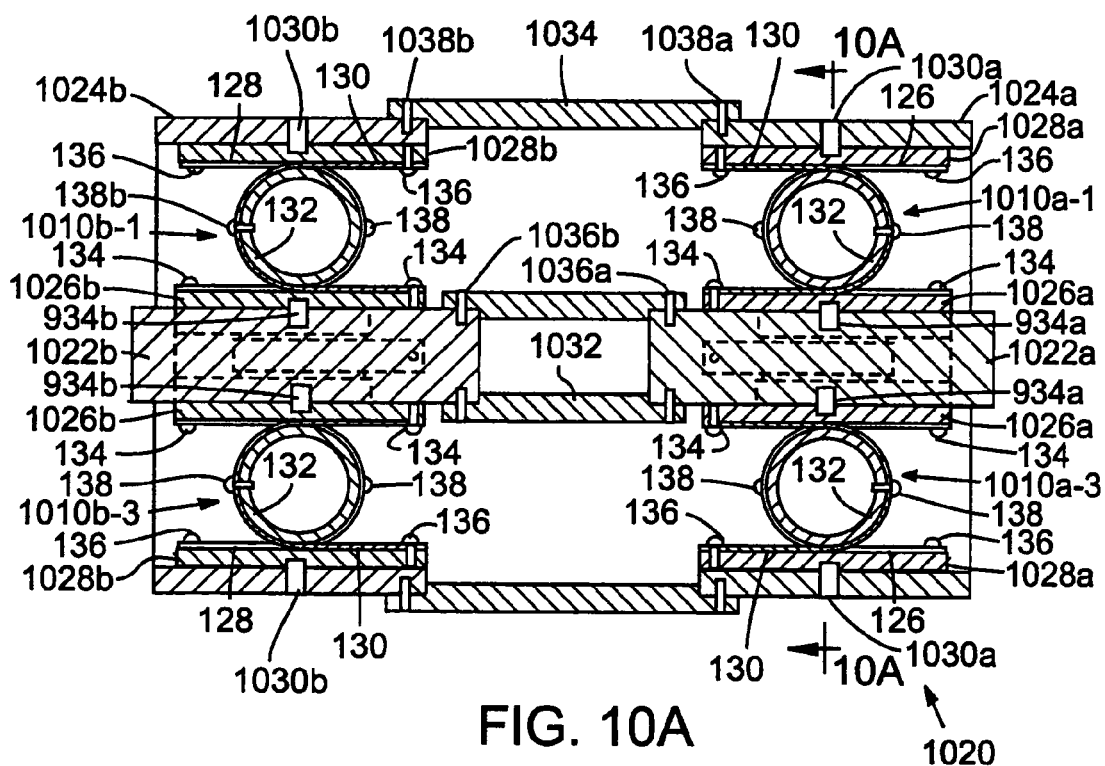
FIG. 10A is a cross-sectional view of the linear roller bearing assembly shown in FIG. 10, taken along line 10A-10A of FIG. 10.

FIG. 10 is a cross-sectional of a linear roller bearing assembly according to a tenth embodiment of the invention. FIG. 10A is a cross-sectional view of the linear roller bearing assembly shown in FIG. 10, taken along line 10A-10A of FIG. 10.

Referring to FIGS. 10 and 10A, a linear roller bearing assembly 1020 according to a tenth embodiment includes roller bearing sub-assemblies (e.g., first roller bearing sub-assemblies 1010a-1 and 1010b-1, second roller bearing sub-assemblies 1010a-2 and 1010b-2 (not shown), third roller bearing sub-assemblies 1010a-3 and 1010b-3 and fourth roller bearing sub-assemblies 1010a-4 and 1010b-4 (not shown), each generically referred to herein as a "roller bearing sub-assembly 1010"), hubs (e.g., first hub 1022a and second hub 1022b), collars (e.g., first collar 1024a and second collar 1024b), hub attachments (e.g., first hub attachments 934a and second hub attachments 934b), collar attachments (e.g., first collar attachments 1030a and second collar attachments 1030b), a hub spacer (e.g., hub spacer 1032), a collar spacer 1034, hub spacer attachments (e.g., first hub spacer attachments 1036a and second hub spacer attachments 1036b) and collar spacer attachments (e.g., first collar spacer attachments 1038a and second collar spacer attachments 1038b). Also shown in FIGS. 10 and 10A are mounting portions (e.g., first mounting portions 1026a and 1026b and second mounting portions 1028a and 1028b).

The roller bearing sub-assemblies 1010 may be provided as exemplarily described with respect to the first embodiment. For example, within each roller bearing sub-assembly 1010, first ends of the first peripheral strap 126, second peripheral strap 128, and central strap 130 is secured to a first mounting portion 1026a or 1026b by first mounting portion attachments 134. Likewise, second ends of the first peripheral strap 126, second peripheral strap 128, and central strap 130 are secured to a second mounting portion 1028a or 1028b by second mounting portion attachments 136. The first mounting portions 1026a and 1026b are coupled to respective ones of the first and second hubs 1022a and 1022b by one or more first hub attachments 934a and one or more second hub attachments 934b, respectively. The second mounting portions 1028a and 1028b are coupled to respective ones of the first and second collars 1024a and 1024b by one or more first collar attachments 1030a and one or more second hub attachments 1030b, respectively. Consequently, the straps 126, 128, and 130 of each roller bearing sub-assembly 1010 can be connected to either a hub 1022a or 1022b or a collar 1024a or 1024b via a first mounting portion 1026a or 1026b or a second mounting portion 1028a or 1028b.

The hub attachments 934a and 934b may be configured in a similar manner as described above with respect to the hub attachments 836. Likewise, each of the hubs 1022a and 1022b, and each of the first mounting portions 1026a and 1026b, may be configured in a similar manner as described above with respect to the eighth embodiment to ensure that the hubs 1022a and 1022b and corresponding ones of the first mounting portions 1026a and 1026b are adequately secured to each other. Similarly, the collar attachments 1030a and 1030b may be configured in a similar manner as described above with respect to the collar attachments 838. Likewise, each of the collars 1024a and 1024b, and each of the second mounting portions 1028a and 1028b, may be configured in a similar manner as described above with respect to the eighth embodiment to ensure that the collars 1024a and 1024b and corresponding ones of the second mounting portions 1028a and 1028b are adequately secured to each other.

In one embodiment, the hub spacer 1032 and the collar spacer 1034 may be components unique to the linear roller bearing assembly 1020. In another embodiment, the hub spacer 1032 and the collar spacer 1034 may be actual components of a machine with which the linear roller bearing assembly 1020 is incorporated. For example, the hub spacer 1032 may comprise different portions of an armature of a linear alternator. In another example, the collar spacer 1034 may be a portion of a cylinder within which the stator is located.

The hub spacer attachments 1036a and 1036b may be configured in a similar manner as described above with respect to the hub attachments 836. Likewise, each of the hubs 1022a and 1022b, and the hub spacer 1032, may be configured in a similar manner as described above with respect to the eighth embodiment to ensure that the hubs 1022a and 1022b and the hub spacer 1032 are adequately secured to each other. Similarly, the collar spacer attachments 1038a and 1038b may be configured in a similar manner as described above with respect to the collar attachments 838. Likewise, each of the collars 1024a and 1024b, and the collar spacer 1034, may be configured in a similar manner as described above with respect to the eighth embodiment to ensure that the collar 1024 and the collar spacer 1034 are adequately secured to each other.

Although the roller bearing sub-assemblies 1010 are described above as being provided as described with respect to the first embodiment, it will be appreciated that each of the roller bearing sub-assemblies 1010 can be provided as any type of roller bearing sub-assembly described herein.

Although the linear roller bearing assembly 1020 has been described above as including groups of four roller bearing sub-assemblies 1010 disposed in a radial pattern around the hubs 1022a and 1022b, and groups of two roller bearing sub-assemblies 1010 disposed in an axial pattern along the hubs 1022a and 1022b, it will be appreciated that the linear roller bearing assembly 1020 can include three or more roller bearing sub-assemblies 1010 disposed in any radial and axial pattern around the hubs 1022a and 1022b.

The hubs 1022a and 1022b and collars 1024a and 1024b may be configured in a similar manner as described above with respect to the hub 622 and collar 624.

FIG. 12 is an end view of a linear roller bearing assembly according to an eleventh embodiment of the invention. FIG. 12A is a cross-sectional view of the linear roller bearing assembly shown in FIG. 12, taken along line 12A-12A of FIG. 12.

Referring to FIGS. 12 and 12A, a linear roller bearing assembly 1220 according to an eleventh embodiment includes roller bearing sub-assemblies (e.g., first roller bearing sub-assembly 1210-1, second roller bearing sub-assembly 1210-2 and third roller bearing sub-assembly 1210-3, each generically referred to herein as a "roller bearing sub-assembly 1210"), a hub (e.g., hub 1222), a collar (e.g., collar 1224), and bores (e.g., first bore 1228-1, second bore 1228-2, and third bore 1228-3, each generically referred to herein as a "bore 1228").

The roller bearing sub-assemblies 1210 are spaced apart from each other at a regular interval around the hub 1222. Each of the roller bearing sub-assemblies 1210 is provided as exemplarily described with respect to FIG. 7.

Within the linear roller bearing assembly 1220, the roller bearing sub-assemblies 1210 support the hub 1222 and precisely guide relative motion between the hub 1222 and the collar 1224 so that gaps 1230 between the hub 1222 and collar 1224 are maintained even as the hub 1222 and collar 1224 move relative to each other along a linear direction.

Although the roller bearing sub-assemblies 1210 are described above as being provided as described with respect to FIG. 7, it will be appreciated that each of the roller bearing sub-assemblies 1210 can be provided as any type of roller bearing sub-assembly described herein.

Although the linear roller bearing assembly 1220 has been described above as including only three roller bearing sub-assemblies 1210 disposed in a radial pattern around the hub 1222, it will be appreciated that the linear roller bearing assembly 1220 can include three or more roller bearing sub-assemblies disposed in a radial pattern around the hub 1222.

The hub 1222 and the collar 1224 may be configured in a similar manner as described above with respect to the hub 622 and collar 624. Moreover, the bores 1228 may be configured to be coupled to a moveable component (e.g., a piston, etc.) or to an immoveable component (e.g., a housing, a mounting point) of a machine (e.g., a Stirling engine, a cryocooler, a pump, etc.). For example, in the illustrated embodiment, a component of the machine may be coupled to the collar 1224 by being threadedly engaged with one or more of the bores 1228. In another example, a flange (not shown) may be provided at an end surface of the collar 1224 and the component of the machine may be coupled to the collar 1224 via the flange (e.g., using a clamp, a bolt, adhesive, or the like or a combination thereof).

Method of Forming Precision Linear Bearing Assembly

FIG. 11 is an end view illustrating the linear roller bearing assembly shown in FIG. 8 at an intermediate stage of fabrication. FIG. 11A is a cross-sectional view of the linear roller bearing assembly shown in FIG. 8, taken along line 11A-11A of FIG. 11, at another intermediate stage of fabrication.

The hub 822 and collar 824 of the linear roller bearing assembly 820 may be formed according to any suitable method. For example, referring to FIG. 11, the linear roller bearing assembly 820 may be fabricated by obtaining or otherwise forming a workpiece 1120 having an inner wall 1122 defining a central bore, and an outer wall 1124.

Next, bores (e.g., first bore 1110-1, second bore 1110-2, third bore 1110-3, fourth bore 1110-4, fifth bore 1110-5 and sixth bore 1110-6, each generically referred to herein as a "bore 1110"), equally spaced apart from one another, can be precision formed (e.g., by drilling, grinding, or the like or a combination thereof) in the workpiece 1120 using the axis of the central bore 1122 as a reference. As exemplarily illustrated, the axis of one bore 1110 is parallel with the axis of every other bore 1110. In the illustrated embodiment, the bores 1110 are disposed in a regular pattern around central bore 1122. It will be appreciated, however, that the bores 1110 may be disposed in any desired arrangement.

After forming the bores 1110, portions of the workpiece 1120 between pairs of adjacent bores 1110 can be removed (e.g., by saw-cutting, drilling, grinding, or the like or a combination thereof) to form gaps (e.g., first gap 840-1, second gap 840-2, third gap 840-3, fourth gap 840-4, fifth gap 840-5 and sixth gap 840-6, each generically referred to herein as the aforementioned "gap 840"). It will be appreciated that the gaps 840 may be made as wide or as narrow as desired. The gaps 840 communicate with the bores 1110 to separate the workpiece 1120 into two separate and distinct pieces corresponding to the hub 822 and the collar 824. Subsequently, the collar 824 may be shortened so that a tensioning ring (see, e.g., tensioning ring 826 shown in FIG. 8) may be accommodated around the hub 822 (see, e.g., FIG. 11A).

The first mounting portions 832 and second mounting portions 834 may be formed by any suitable method. For example, a pair of mounting portions 832 and 834 may be fabricated by obtaining or otherwise forming a solid, cylindrical workpiece (not shown) having a diameter that is approximately equal to the diameter of a bore 1110. The workpiece may then be processed (e.g., by cutting, drilling, grinding, or the like or a combination thereof) to remove a central portion of the workpiece, thereby forming the strap-supporting surfaces 123a and 125b of the mounting portions 832 and 834, respectively.

Subsequently, the roller-bearing sub-assemblies 810 may be formed, inserted into the bores 1110 and secured to the hub 822 and 824 as exemplarily described above.

FIG. 13 is an end view of the linear roller bearing assembly shown in FIGS. 12 and 12A at an intermediate stage of fabrication. FIG. 13A is a cross-sectional view of the linear roller bearing assembly shown in FIG. 13, taken along line 13A-13A of FIG. 13.

The hub 1222 and collar 1224 of the linear roller bearing assembly 1220 may be formed according to any suitable method. For example, referring to FIGS. 13 and 13A, the linear roller bearing assembly 1220 may be fabricated by obtaining or otherwise forming a workpiece 1320 having an inner wall 1322 defining a central bore, and an outer wall 1324.

Next, bores (e.g., first bore 1310-1, second bore 1310-2, third bore 1310-3, each generically referred to herein as a "bore 1310"), equally spaced apart from one another, can be precision formed (e.g., by drilling, grinding, or the like or a combination thereof) in the workpiece 1320 using the axis of the central bore 1322 as a reference. As exemplarily illustrated, the axis of one bore 1310 is parallel with the axis of every other bore 1310. In the illustrated embodiment, the bores 1310 are disposed in a regular pattern around central bore 1322. It will be appreciated, however, that the bores 1310 may be disposed in any desired arrangement.

The bores 1228 are also formed (e.g., by cutting, drilling, grinding, or the like or a combination thereof) in the workpiece 1320 using the axis of the central bore 1322 as a reference. The bores 1228 can be formed before or after the bores 1310 are formed. In another embodiment, the bores 1228 can be formed contemporaneously with the formation of the bores 1310.

After forming the bores 1310, portions of the workpiece 1320 between pairs of adjacent bores 1310 can be removed (e.g., by saw-cutting, drilling, grinding, or the like or a combination thereof) to form gaps (e.g., first gap 1230-1, second gap 1230-2 and third gap 1230-3, each generically referred to herein as the aforementioned "gap 1230"). It will be appreciated that the gaps 1230 may be made as wide or as narrow as desired. The gaps 1230 communicate with the bores 1310 to separate the workpiece 1320 into two separate and distinct pieces corresponding to the hub 1222 and the collar 1224.

Opposing portions of the hub 1222 and collar 1224, which are spaced apart from each other by respective bores 1310, correspond to the mounting portions of the hub 1222 and collar 1224, respectively. Opposing sidewall surfaces 1328 and 1330 of each bore 1310 are precisely planar and parallel. Thus, the mounting portions of the hub 1222 and collar 1224 correspond to the first and second mounting portions 122 and 124, respectively, and the surfaces 1328 and 1330 correspond to the strap-supporting surfaces 123a and 125a of the first and second mounting portions 122 and 124, respectively.

Subsequently, the roller-bearing sub-assemblies 1210 may be formed, inserted into the bores 1310 and secured to the hub 1222 and 1224 as exemplarily described above.

Reciprocating Machinery Using Linear Roller Bearing Assemblies

Figure 14:
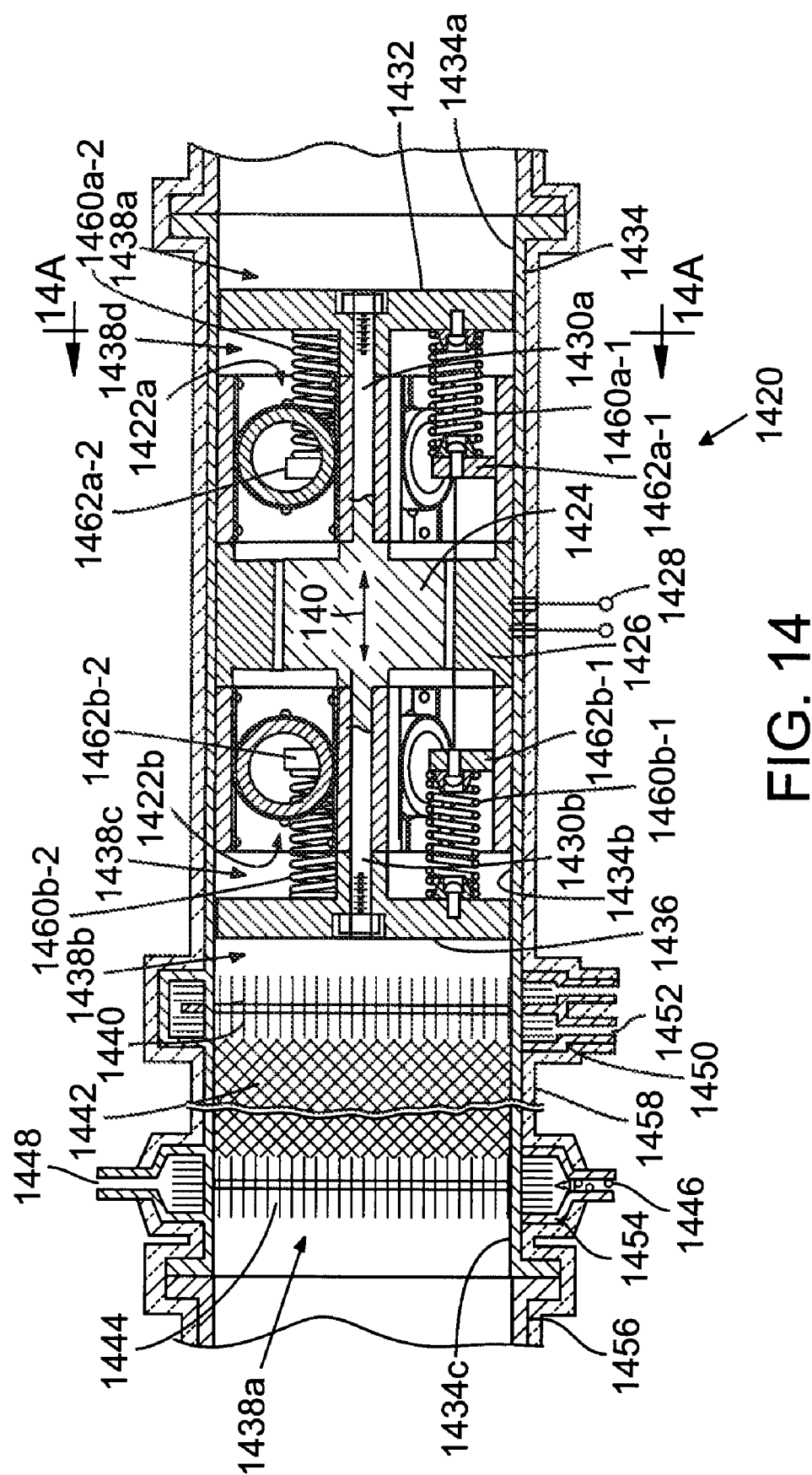
FIG. 14 is a partial cross-sectional view of a Stirling engine power module incorporating a linear roller bearing assembly having a plurality of roller bearing sub-assemblies, such as the roller bearing sub-assembly illustrated in FIG. 1, according to a twelfth embodiment of the invention.
Figure 14A:
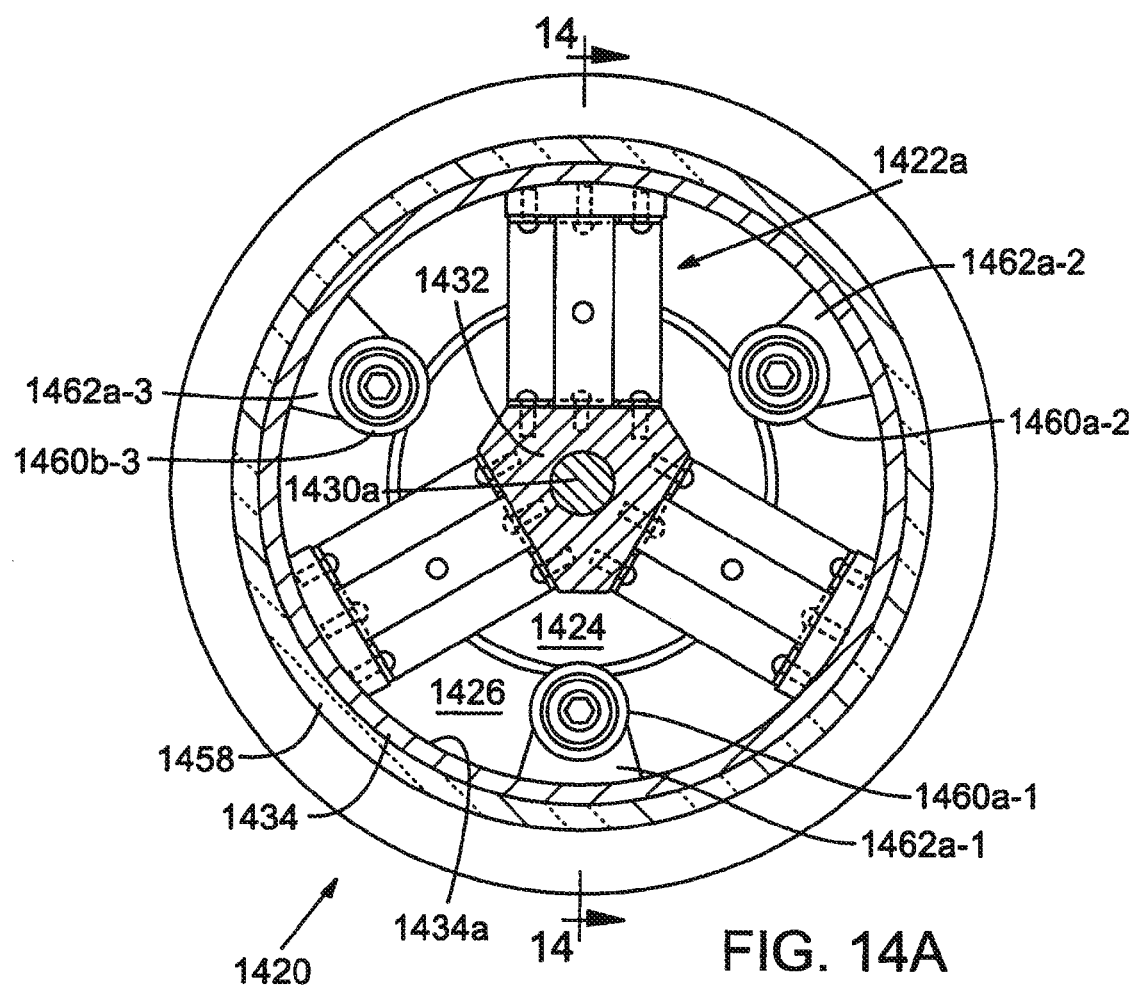
FIG. 14A is a cross-sectional view of the Stirling engine power module shown in FIG. 14, taken along line 14A-14A of FIG. 14.

FIG. 14 is a cross-sectional view of a Stirling engine power module incorporating a linear roller bearing assembly having a plurality of roller bearing sub-assemblies, such as the roller bearing sub-assembly illustrated in FIG. 1, according to a twelfth embodiment of the invention. FIG. 14A is a cross-sectional view of the Stirling engine power module shown in FIG. 14, taken along line 14A-14A of FIG. 14.

Referring to FIGS. 14 and 14A, a Stirling engine power module 1420 may, for example, include one or more guiding mechanisms such as any of the aforementioned linear roller bearing assemblies (exemplarily illustrated in FIG. 14 as first linear roller bearing assembly 1422a and second linear roller bearing assembly 1422b), a linear alternator (e.g., including an armature 1424 and a stator 1426), electrical connections (e.g., electrical connections 1428), a hot piston 1432 and a cold piston 1436. These components are disposed within a cylinder 1434 having surfaces 1434a and 1434b. To have a minimum clearance annular gap between the pistons 1432 and 1436 and the cylinder 1434, the hot piston 1432 and the cold piston 1436 should be precisely centered relative to the surfaces 1434a and 1434b.

The Stirling engine power module 1420 may further include a plurality of working gas-containing regions, e.g., working-gas region 1438a (i.e., a "hot working gas-containing region"), working-gas region 1438b (i.e., a "cold working gas-containing region"), working-gas region 1438c (i.e., a cold-end bounce gas region) and working-gas region 1438d (i.e., a hot-end bounce gas region), within which a working gas (e.g., helium, hydrogen, nitrogen, air, or the like) can be contained. The hot piston 1432 is disposed at the "hot end" of the Stirling engine power module 1420 and the cold piston 1436 is disposed at the "cold end" of the Stirling engine power module 1420. As exemplarily illustrated, the working-gas region 1438a adjacent to the hot piston 1432 is disposed at the hot end of the Stirling engine power module 1420 and the working-gas region 1438a adjacent to the working gas heater 1444 and cold piston 1436 is disposed at the cold end of the Stirling engine power module 1420.

The Stirling engine power module 1420 may further include a working gas cooler (e.g., working gas cooler 1440), a regenerator 1442 (e.g., regenerator 1442), a working gas heater (e.g., working gas heater 1444), fuel 1446, a burner outlet 1448, a cold-end heat exchanger 1450, coolant 1452 and a burner 1454. Working gas manifolds such as working gas manifolds 1456 may be disposed at opposite ends of the Stirling engine power module 1420 to couple the Stirling engine power module 1420 with other Stirling engine power modules as necessary. An insulator 1458 may be provided to substantially surround the Stirling engine power module 1420.

The Stirling engine power module 1420 may further include centering springs (e.g., first centering springs 1460a-1 and 1460b-1, second centering springs 1460a-2 and 1460b-2 and third centering springs 1460a-3 and 1460b-3) and spring mounting blocks (e.g., first spring mounting blocks 1462a-1 and 1462b-1, second spring mounting blocks 1462a-2 and 1462b-2 and third spring mounting blocks 1462a-3 and 1462b-3). One function of the centering springs 1458 is to maintain the mid-stroke position of the moving components to be axially centered within the Stirling engine power module 1420. The centering springs 1458 also provide additional axial spring rate as required for the Stirling engine power module 1420.

In one embodiment, the first linear roller bearing assembly 1422a and second linear roller bearing assembly 1422b may each be provided as the linear roller bearing assembly described above with respect to the eleventh embodiment. The armature 1424 and stator 1426 are disposed between the first linear roller bearing assembly 1422a and second linear roller bearing assembly 1422b. In one embodiment, the armature 1424 and stator 1426 may abut the first linear roller bearing assembly 1422a and second linear roller bearing assembly 1422b. The armature 1424 and stator 1426 may be provided in any manner known in the art. In one embodiment, the armature 1424 and/or stator 1426 may include wire windings, or may include magnets instead of or in addition to wire windings.

In one embodiment, the armature 1424 may be coupled to the first linear roller bearing assembly 1422a and second linear roller bearing assembly 1422b by being threadedly engaged with bores formed in the hubs (e.g., hub 1222, see FIG. 12) of the linear roller bearing assemblies 1422a and 1422b. Similarly, the stator 1426 may be coupled to the first linear roller bearing assembly 1422a and second linear roller bearing assembly 1422b by being threadedly engaged with bores (e.g., bores 1228-1, 1228-2, and 1228-3, see FIG. 12) formed in the collars (e.g., collar 1224, see FIG. 12) of the linear roller bearing assemblies 1422a and 1422b.

In one embodiment, the hot piston 1432 may include a thermally insulated cap (not shown) to reduce axial heat conduction within the cylinder 1434. The hot piston 1432 may be coupled to the first linear roller bearing assembly 1422a by being threadedly engaged with the bore formed in the hub (e.g., hub 1222, see FIG. 12) of the first linear roller bearing assembly 1422a. Likewise, the cold piston 1436 may be coupled to the second linear roller bearing assembly 1422b by being threadedly engaged with the bore formed in the hub (e.g., hub 1222, see FIG. 12) of the second linear roller bearing assembly 1424b.

Although the Stirling engine power module 1420 has been described above as including linear roller bearing assemblies such as that described above with respect to the eleventh embodiment, it will be appreciated that the Stirling engine power module 1420 may include three or more of any of the linear roller bearing assemblies described herein, or other types of linear bearing assemblies as well.

The working gas cooler 1440 can be formed from a high thermal conductivity material such as copper, brass, aluminum, or the like or a combination thereof, and be configured into cylindrical finned structures as commonly used in radiators, or other liquid/gas heat exchangers.

The regenerator 1442 can be formed from fine metal wires or thin foils configured so as to define uniform gas flow passages. The fine metal wires can be felted and sinter bonded to form a porous structure. The thin foils can be configured in parallel flat or concentric patterns. The regenerator 1442 can be formed from materials such as high temperature stainless steel.

The working gas heater 1444 can be formed from a high temperature material such as super alloys containing nickel and chrome, or any materials commonly used in jet engines. The working gas heater 1444 can be configured with flat plates or tubular passageways, which the working gas can pass over and through to facilitate heat transfer.

The axial distance between the working gas cooler 1440 and the working gas heater 1444 may be made as large as desired to prevent excessive heat transfer between the working gas heater 1444 and the working gas cooler 1440. In addition, the thickness of the wall of the cylinder 1434 may be as thin as desired to prevent excessive axial conduction down the cylinder wall between the working gas heater 1444 and the working gas cooler 1440, but should be thick enough to adequately contain the working gas, which is contained within the working gas-containing regions 1438a, 1438b, 1438c and 1438d at significantly elevated pressures.

The burner 1454 is configured to burn fuel 1446 and is in close thermal contact with the working gas heater 1444 around the perimeter of the cylinder 1434. Upon burning the fuel 1446, heat is generated which is then transmitted to the working gas heater 1444 about the perimeter of the cylinder 1434. The fuel 1446 may include natural gas, propane, fuel oil, kerosene, gasoline, or JP4 fuel.

The cold-end heat exchanger 1450 is configured to route the coolant 1452 in close thermal contact with the working gas cooler 1440 around the perimeter of the cylinder 1434. Heat within the working gas contained in the working gas-containing region 1438b is transferred to the coolant 1452 that is routed through the cold-end heat exchanger 1450. The coolant 1452 may include water-based anti-freeze fluids (e.g., ethylene glycol) or high conductivity oils. In one embodiment, the coolant 1452 can be any long-life, permanent anti-freeze fluid as used in commercial engine systems.

The insulator 1458 may be formed from high temperature ceramic fibers, a vacuum form of insulation with concentric separated metal foils. In low-temperature regions (e.g., in regions adjacent to the cold-end heat exchanger 1450, working gas cooler 1440 and cold piston 1436), the insulator 1458 can be formed from foam plastics such as Styrofoam, fiber glass, or the like or a combination thereof. Thicknesses of the insulator 1458 can be in the range of about 2 cm to about 8 cm.

The centering springs 1460a-1, 1460a-2 and 1460a-3 are coupled between respective ones of the spring mounting blocks 1462a-1, 1462a-2 and 1462a-3 and the hot piston 1432. Likewise, the centering springs 1460b-1, 1460b-2 and 1460b-3 are coupled between respective ones of the spring mounting blocks 1462b-1, 1462b-2 and 1462b-3 and the cold piston 1436. The spring mounting blocks 1462a-1, 1462b-1, 1462a-2, 1462b-2, 1462a-3 and 1462b-3 are, in turn, fixed to the cylinder 1434, or they may be integrally formed with the cylinder 1434.

Although FIG. 14 illustrates wherein the Stirling engine power module 1420 includes a burner 1454 to provide heat to the working gas within the working gas-containing region 1438a, working gas within the working gas-containing region 1438a can be heated by any suitable heat source. For example, sunlight can be focused onto the Stirling engine power module 1420 by a solar concentrator (e.g., a reflective, parabolic dish). Other heat sources include geothermal heat sources, nuclear heat sources, biological heat sources, two-phase thermal storage systems and waste heat sources.

The Stirling engine power module 1420 is part of a multi-cylinder Stirling engine, which is interconnected with the working gas manifolds 1456 to create a closed-loop series configuration. In the theoretical Stirling cycle, working gas pressures in each adjacent Stirling engine power module vary with a phase difference. This phase difference, along with changing gas pressures, and component motions are complexly dependant on the spring-mass properties of the moving components along with the thermodynamic and gas dynamic properties so as to create an efficiently performing engine. The burner 1454 converts chemical energy stored within the fuel 1446 into heat, which is conducted into the gas heater 1444 where it heats the working gas and raises its pressure within the working gas-containing region 1438a. The regenerator 1442 functions to cyclically store heat from the hot working gas as it flows through it and to give the heat back as the working gas flows back. The gas cooler 1440 receives heat from the working gas which lowers its temperature and pressure. The cold-end gas exchanger 1450 accepts the heat from the gas cooler 1440 as well as parasitic heat conducted by wall of cylinder 1434 and rejects this waste heat to the coolant 1452.

The linear roller bearing assemblies 1422a and 1422b support and precisely guide movement of the pistons 1432 and 1436 and armature 1424 within the cylinder 1434 so that a narrow annular clearance seal is formed between the hot piston 1432 and surface 1434a and between the cold piston 1436 and the surface 1434b, and so that an "air gap" is formed between the armature 1424 and the stator 1426. The clearance seal between the hot piston 1432 and surface 1434a should be adequate to prevent excessive working gas leakage between the working gas-containing regions 1438a and 1438d. The clearance seal between the cold piston 1436 and surface 1434b should be adequate to prevent excessive working gas leakage between the working gas-containing regions 1438b and 1438c.

The "air gap" between the armature 1424 and stator 1426 is typically wider than the aforementioned clearance seals. Therefore, to prevent excessive working gas leakage between the working gas-containing regions 1438c and 1438d, a liner or sleeve (not shown) can be attached to the armature 1424 and/or the stator 1426 to form a clearance seal sufficiently narrow to prevent excessive working gas leakage between the working gas-containing regions 1438c and 1438d. The liner may be formed of a non-ferromagnetic material such as plastic or the like. All of these non-contact clearance seals prevent wear and results in infinite piston seal life.

The hot piston 1432 and one end of the armature 1424 (i.e., a "hot end of the armature 1424") are exposed to the working-gas containing region 1438d. Likewise, the cold piston 1436 and another end of the armature 1424 (i.e., a "cold end of the armature 1424") are exposed to the working-gas containing region 1438c. In the illustrated embodiment, the area of the hot piston 1432 that is exposed to the working gas-containing region 1438d is larger than the area of the hot end of the armature 1424 that is exposed to the working gas-containing region 1438d. Likewise, the area of the cold piston 1436 that is exposed to the working gas-containing region 1438c is larger than the area of the cold end of the armature 1424 that is exposed to the working gas-containing region 1438c.

During operation of a multi-cylinder Stirling engine formed of many Stirling engine power modules 1420, pressure rises and falls within the working gas-containing region 1438a of one Stirling engine power module 1420 in a phased, cyclic manner when pressure rises and falls within the working gas-containing region 1438a of an adjacent Stirling engine power module 1420. The phased, cyclic pressure fluctuations alternately produce high and low pressures that act on the hot and cold pistons 1432 and 1436 and cause the armature 1424 to reciprocate along the aforementioned selected direction indicated by arrow 140. The aforementioned differences in exposed areas of the hot and cold pistons 1432 and 1436 relative to the hot and cold ends of the armature 1424 produce restoring forces (e.g., gas spring restoring forces) that help to reverse motion of the hot and cold pistons 1432 and 1436, and the armature 1424, during operation of the Stirling engine power module 1420. In this sense, the armature 1424 also functions as a piston, herein also referred to as an "armature piston 1424." Motion of the armature 1424 relative to the stator 1426 causes the stator 1426 to produce electric power, which can be accessed at the electrical connections 1428. The cyclic operation of the Stirling engine power module 1420 as exemplarily described above produces a double-acting, high-power density engine/alternator.

Constructed as described above, the hot piston 1432, cold piston 1436, components of the linear alternator, and working gas-containing regions 1438c and 1438d form a gas spring-mass system. The gas spring-mass system can be tuned at least by adjusting the volume of the working gas-containing regions 1438c and 1438d, by adjusting the average working gas pressure, by adjusting the exposure area of the hot piston 1432 and/or the armature 1424 to the working gas-containing region 1438d, by adjusting the exposure area of the cold piston 1436 and/or the armature 1424 to the working gas-containing region 1438c, by adjusting the mass of the armature 1424, the hot piston 1432 and/or the cold piston 1436, or the like or a combination thereof. Tuning the gas spring-mass system appropriately may help to allow the armature 1424 to achieve a desired resonant operating frequency (e.g., 60 Hz).

In one embodiment, the gas spring-mass system is tuned by increasing or decreasing the exposure area of the hot and cold ends of the armature 1424. When the exposure area of the hot and cold ends of the armature 1424 decrease, the natural frequency of the gas spring-mass system increases and the gas spring becomes more stiff; when the exposure area of the hot and cold ends of the armature 1424 increase, the natural frequency of the gas spring-mass system decreases and the gas spring becomes less stiff.

In another embodiment, the gas spring-mass system is tuned by decreasing the volume of the working gas-containing regions 1438c and 1438d. Decreasing the volume of the working gas-containing regions 1438c and 1438d causes the gas spring to become more stiff, which increases the natural frequency of the gas spring-mass system.

The armature 1424 and stator 1426 may be provided in any manner as desired. For example, the armature 1424 may include one or more magnets, one or more conductive windings, or a combination thereof. In one embodiment, one or more of the linear bearing assemblies 1422a and 1422b includes at least one electrical connector as exemplarily described above with respect to the sixth embodiment. In such an embodiment, the armature 1424 may include one or more conductive windings that are electrically connected to one or more of the electrical connectors which, in turn, may be connected to a power source (not shown). In one embodiment, the armature 1424 includes three conductive windings and each conductive winding is electrically connected to a different electrical conductor. In one embodiment, the stator 1426 may include conductive windings. When the stator 1426 includes conductive windings, electrical power may be applied to at least one conductive winding of the armature 1424 sufficient to move the armature 1424 relative to the stator 1426 (e.g., along the selected direction indicated by arrow 140), thereby adjusting the mid-stroke position of the armature 1424, as well as the pistons 1432 and 1436.

In the illustrated embodiment, clearance seals are formed between the hot piston 1432 and surface 1434a of the cylinder 1434 as well as between the cold piston 1436 and the surface 1434b of the cylinder 1434. In another embodiment, however, the size of the hot piston 1432 and cold piston 1436 could be changed and mating cylinders (not shown) could be secured to the cylinder 1434. The mating cylinders can be secured to portions of the cylinder that are radially adjacent to the hot and cold pistons having the changed size to provide clearance seals as described above. By adjusting or changing the size of the hot piston 1432 and the cold piston 1436, the overall weight of the gas spring-mass system can be adjusted, which may help to allow the armature 1424 to achieve a desired resonant operating frequency (e.g., 60 Hz).

Constructed as described above, the linear roller bearing assemblies 1422a and 1422b support and precisely guide movement of the hot piston 1432 and the cold piston 1436 relative to the cylinder surfaces 1434a and 1434b of the Stirling engine cycle 1420. Likewise, the linear roller bearing assemblies 1422a and 1422b support and precisely guide movement of the armature 1424 relative to the stator 1426. The stroke length of the hot and cold pistons 1432 and 1436 and overall operating frequency of the Stirling engine cycle 1420 can be increased by using linear roller bearing assemblies as exemplarily described herein instead of conventional bearings such as flexure-type bearings. Accordingly, the Stirling engine cycle 1420 can enjoy increased system efficiency and power density compared to Stirling engine cycles incorporating conventional flexure bearings. Moreover, use of the linear roller bearing assemblies as exemplarily described herein can advantageously lower the operating cost of the Stirling engine cycle 1420, as well as reduce the cost to manufacture the Stirling engine cycle 1420 and lower its weight.

Figure 15:
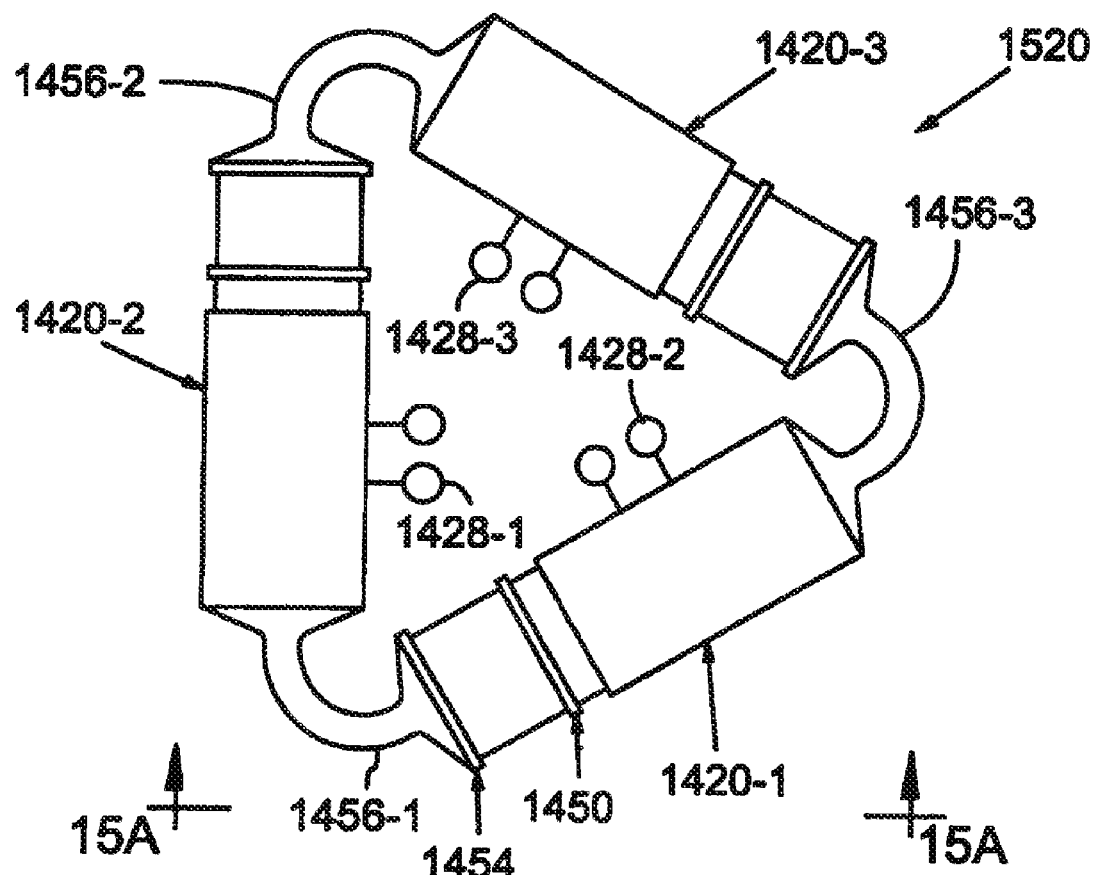
FIG. 15 is a top view of a multi-cylinder Stirling engine incorporating a plurality of Stirling engine power modules, such as the Stirling engine power module illustrated in FIG. 14, according to a thirteenth embodiment of the invention.
Figure 15A:
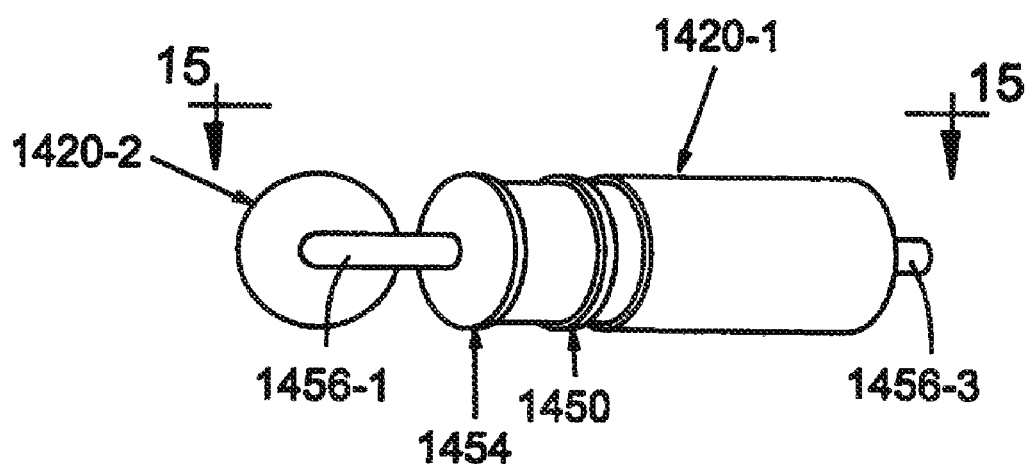
FIG. 15A is a side view of the multi-cylinder Stirling engine shown in FIG. 15, taken along line 15A-15A of FIG. 15.

FIG. 15 is a top view of a multi-cylinder Stirling engine incorporating a plurality of Stirling engine power modules, such as the Stirling engine power module illustrated in FIG. 14, according to a thirteenth embodiment of the invention. FIG. 15A is a side view of the Stirling engine system shown in FIG. 15, taken along line 15A-15A of FIG. 15.

Referring to FIGS. 15 and 15A, a multi-cylinder Stirling engine 1520 includes Stirling engine power modules (e.g., a first Stirling engine power module 1420-1, a second Stirling engine power module 1420-2 and a third Stirling engine power module 1420-3, each generically referred to as the aforementioned "Stirling engine power module 1420") connected together by working gas manifolds (e.g., a first working gas manifold 1456-1, a second working gas manifold 1456-2 and a third working gas manifold 1456-3, each generically referred to as the aforementioned "working gas manifold 1456").

Within the multi-cylinder Stirling engine 1520, the Stirling engine power modules 1420 are disposed in a closed loop having a triangular shape, and are all disposed in a single level (e.g., such that bottom and/or top surfaces of the Stirling engine power modules 1420 are coplanar with each other). Each Stirling engine power module 1420 is connected to another Stirling engine power module 1420 by a working gas manifold 1456. Thus, the Stirling engine power modules 1420 are connected in series with each other via the working gas manifolds 1456.

The Stirling engine power modules 1420-1, 1420-2 and 1420-3 may each be provided as the Stirling engine power module 1420 described above with respect to the twelfth embodiment. Accordingly, the working gas-containing region 1438a at the hot end of one Stirling engine power module 1420 communicates directly with the working gas-containing region 1438a at the cold end of another Stirling engine power module 1420 via a working gas manifold. In other embodiments, however, the multi-cylinder Stirling engine 1520 may include any type of Stirling engine power module.

In one embodiment, heat can be delivered to the working gas-containing regions 1438a of some or all of the Stirling engine power modules 1420 from a common heat source (not shown). In another embodiment, however, heat can be delivered to the working gas-containing regions 1438a of one or more or all of the Stirling engine power modules 1420 from an independent heat source (not shown). Exemplary heat sources include burner such as a burner 1454, concentrated solar heat sources, geothermal heat sources, nuclear heat sources, biological heat sources, two-phase thermal storage systems and waste heat sources, or the like or a combination thereof.

Constructed as described above, the Stirling engine power modules 1420 operate 120 degrees (or approximately 120 degrees) out of phase with each other. The result of the operational phase difference between the various Stirling engine power modules 1420 is that high thermodynamic engine efficiency and power density can be achieved and vibration caused by piston motion in one Stirling engine power module can be effectively cancelled out in the rotary direction by vibration caused by piston motion in the other Stirling engine power modules.

Constructed as described above, the multi-cylinder Stirling engine 1520 provides compact manifolding between the different Stirling engine power modules so as to minimize working gas dead volume. The arrangement of Stirling engine power modules and configuration of working gas manifolds creates a flat triangular pattern, which can be practical for installations requiring a low profile while also providing a mutli-cycle Stirling engine at relatively low cost. The illustrated multi-cylinder Stirling engine 1520 outputs 3-phase electric power, which can be useful in many applications. Power output by the multi-cylinder Stirling engine 1520 may also be rectified or modified using one or more suitable electronic control devices (not shown). Engine output wires (not shown) can be made relatively small for 3-phase power output delivery.

Although the multi-stage Stirling engine 1520 has been described as including only three Stirling engine power modules connected together in series, it will be appreciated that the multi-cylinder Stirling engine 1520 may include more than three Stirling engine power modules connected together in series to increase power and efficiency, reduce phase lag between cycles, and to reduce flow and dead volume losses in the working gas manifolds.

In one embodiment, the number of Stirling engine power modules included within the multi-cylinder Stirling engine 1520 corresponds to the number of sides of the closed loop. In such an embodiment, in a multi-cylinder Stirling engine 1520 including four Stirling engine power modules, the shape of the closed loop would resemble a square, or be rectangular. In a multi-cylinder Stirling engine 1520 including five Stirling engine power modules, the shape of the closed loop would be pentagonal. Thus, closed loop shape of the multi-cylinder Stirling engine 1520 can be any polygonal shape (e.g., hexagonal, heptagonal, octagonal, etc.), depending on the number of Stirling engine power modules (e.g., six, seven, eight, etc.) that are included within the multi-cylinder Stirling engine. It will be appreciated that the operational phase difference between each adjacent Stirling engine power module can correspond to the number of sides of the closed loop. For example, when the closed loop of the Stirling engine 1520 has four sides, the operational phase difference between adjacent Stirling engine modules is approximately 90 degrees.

Figure 16:
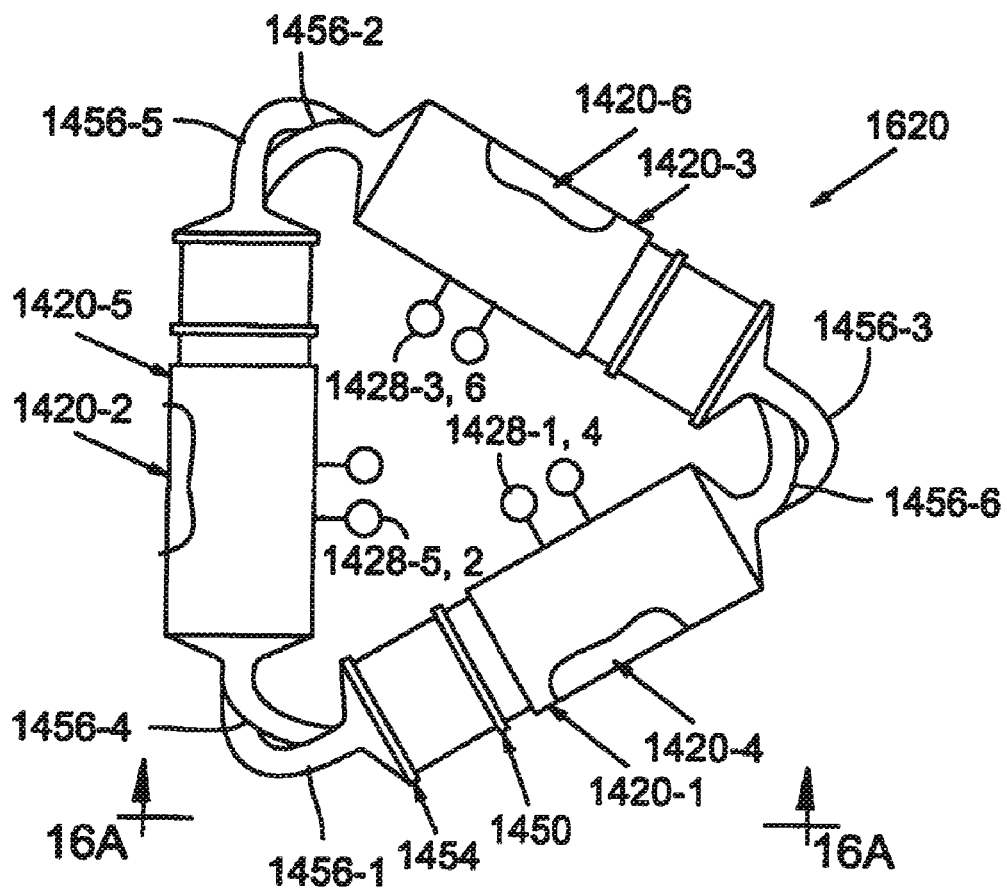
FIG. 16 is a top view of a multi-cylinder Stirling engine incorporating a plurality of Stirling engine power modules, such as the Stirling engine power module illustrated in FIG. 14, according to a fourteenth embodiment of the invention.
Figure 16A:
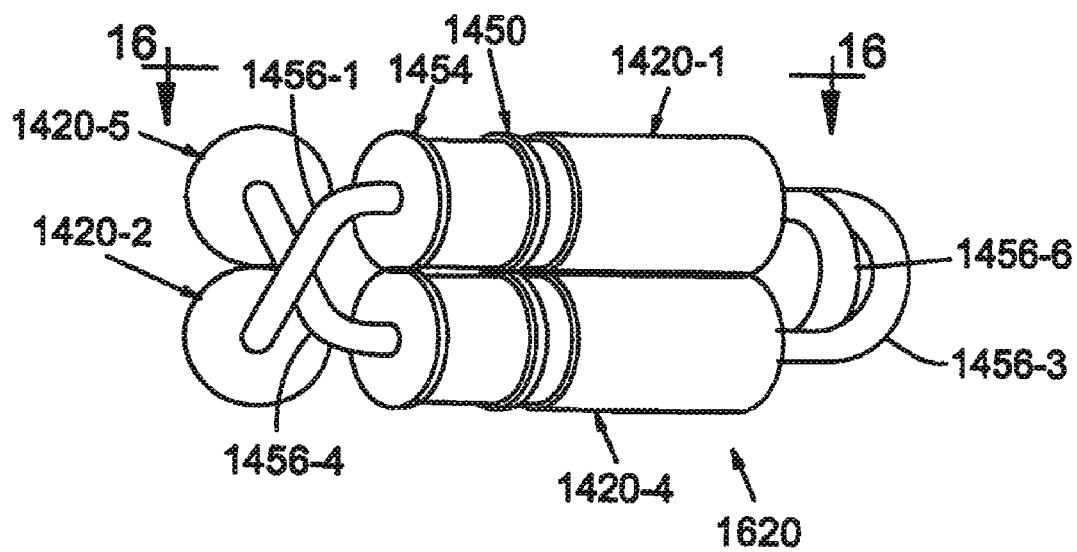
FIG. 16A is a side view of the multi-cylinder Stirling engine shown in FIG. 16, taken along line 16A-16A of FIG. 16, according to one embodiment.
Figure 16B:
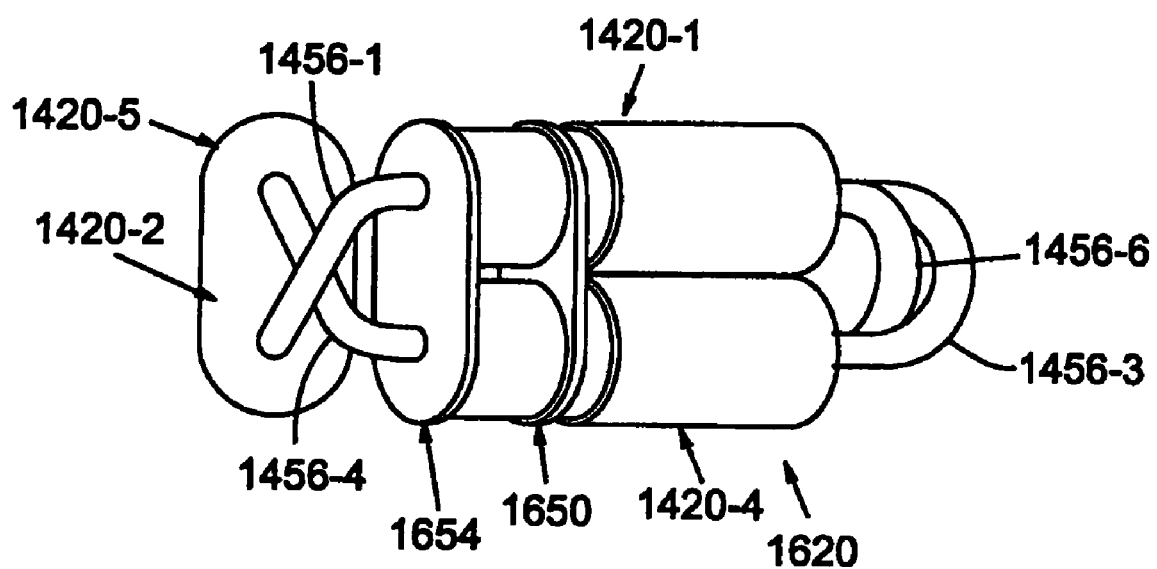
FIG. 16B is a side view of the multi-cylinder Stirling engine shown in FIG. 16, taken along line 16A-16A of FIG. 16, according to another embodiment.

FIG. 16 is a top view of a Stirling engine system incorporating a plurality of Stirling engine power modules, such as the Stirling engine power module illustrated in FIG. 14, according to a fourteenth embodiment of the invention. FIG. 16A is a side view of the multi-cylinder Stirling engine shown in FIG. 16, taken along line 16A-16A of FIG. 16, according to one embodiment. FIG. 16B is a side view of the multi-cylinder Stirling engine shown in FIG. 16, taken along line 16A-16A of FIG. 16, according to another embodiment.

Referring to FIGS. 16 and 16A, a multi-cylinder Stirling engine 1620 includes Stirling engine power modules (e.g., a first Stirling engine power module 1420-1, a second Stirling engine power module 1420-2, a third Stirling engine power module 1420-3, a fourth Stirling engine power module 1420-4, a fifth Stirling engine power module 1420-6 and a sixth Stirling engine power module 1420-6, each generically referred to herein as the aforementioned "Stirling engine power module") connected together by working gas manifolds (e.g., a first working gas manifold 1456-1, a second working gas manifold 1456-2, a third working gas manifold 1456-3, a fourth working gas manifold 1456-4, a fifth working gas manifold 1456-5 and a sixth working gas manifold 1456-6, each generically referred to herein as the aforementioned "working gas manifold").

Within the multi-cylinder Stirling engine 1620, the Stirling engine power modules 1420 are disposed in a closed loop having two levels also having the aforementioned triangular shape. For example, the first, third and fifth Stirling engine power modules 1420-1, 1420-3 and 1420-5 are disposed in an upper level of the multi-cylinder Stirling engine 1620 and the second, fourth and sixth Stirling engine power modules 1420-2, 1420-4 and 1420-6 are disposed in a lower level of the multi-cylinder Stirling engine 1620.

The Stirling engine power modules 1420 are connected in series with each other via the working gas manifolds 1456 such that the first, third and fifth working gas manifolds 1456-1, 1456-3 and 1456-5 route working gas from Stirling engine power modules 1420 in the upper level to corresponding Stirling engine power modules 1420 in the lower level, and such that the second, fourth and sixth working gas manifolds 1456-2, 1456-4 and 1456-6 route working gas from Stirling engine power modules 1420 in the lower level to corresponding Stirling engine power modules 1420 in the upper level.

In the illustrated embodiment, the Stirling engine power modules 1420-1, 1420-2, 1420-3, 1420-4, 1420-5 and 1420-6 may each be provided as the Stirling engine power module 1420 described above with respect to the twelfth embodiment. Accordingly, the working gas-containing region 1438*a* of one Stirling engine power module communicates directly with the working gas-containing region 1438*a* of another Stirling engine power module via a working gas manifold. In other embodiments, however, the multi-cylinder Stirling engine 1620 may include any type of Stirling engine power module.

In the embodiment illustrated in FIG. 16A, the cold-end heat exchanger 1450 and burner 1454 of a Stirling engine power module arranged at one position in the upper level (e.g., the first Stirling engine power module 1420-1) are aligned with the cold-end heat exchanger 1450 and burner 1454 of another Stirling engine power module arranged at a corresponding position in the lower level (e.g., the fourth Stirling engine power module 1420-4). Accordingly, in the embodiment illustrated in FIG. 16B, a single, monolithic burner 1654 can be used to heat the working gas within the first and fourth Stirling engine power modules 1420-1 and 1420-4 (as well as other pairs of overlapping Stirling engine power modules). Likewise a single, monolithic cold-end heat exchanger 1650 can be used to cool the working gas within the first and fourth Stirling engine power modules 1420-1 and 1420-4 (as well as other pairs of overlapping Stirling engine power modules).

In one embodiment, heat can be delivered to the working gas-containing regions 1438*a* of some or all of the Stirling engine power modules 1420 from a common heat source (not shown). In another embodiment, however, heat can be delivered to the working gas-containing regions 1438*a* of one or more or all of the Stirling engine power modules 1420 from an independent heat source (not shown).

Similar to the multi-cylinder Stirling engine 1520, the multi-cylinder Stirling engine 1620 provides compact manifolding between the different Stirling engine power modules. The arrangement of Stirling engine power modules and configuration of working gas manifolds also creates a relatively flat triangular pattern, which can be practical for installations requiring a low profile while also providing a mutli-cycle Stirling engine at relatively low cost. Also similar to the multi-cylinder Stirling engine 1520, the illustrated multi-cylinder Stirling engine 1620 outputs 3-phase electric power, which can be useful in many applications, and power output by the multi-cylinder Stirling engine 1620 may be rectified or modified using one or more suitable electronic control devices (not shown). If each Stirling engine power module in the upper level is electrically connected in parallel to an adjacent Stirling engine power module in the lower level, the multi-cylinder Stirling engine 1620 can output 3-phase electric power.

Constructed as described above, the Stirling engine power modules 1420 operate 60 degrees (or approximately 60 degrees) out of phase with each other. That is, operation of the first Stirling engine power module 1420-1 can be 60 degrees out of phase with operation of the second Stirling engine power module 1420-2, operation of the second Stirling engine power module 1420-2 can be 60 degrees out of phase with operation of the third Stirling engine power module 1420-3, and so on. The result of the operational phase difference between the various Stirling engine power modules is that high thermodynamic engine efficiency and power density can be achieved.

Also due to the configuration of the multi-cylinder Stirling engine 1620, operation of the first Stirling engine power module 1420-1 can be 180 degrees out of phase with operation of the fourth Stirling engine power module 1420-4, operation of the second Stirling engine power module 1420-2 can be 180 degrees out of phase with operation of the fifth Stirling engine power module 1420-5 and operation of the third Stirling engine power module 1420-3 can be 180 degrees out of phase with operation of the sixth Stirling engine power module 1420-6. The result of the operational phase difference is that the direction of piston motion in one Stirling engine power module arranged at one position in the upper level (e.g., first Stirling engine power module 1240-1) is opposite the direction of piston motion in another Stirling engine power module arranged at a corresponding position in the lower level (e.g., fourth Stirling engine power module 1240-4). Consequently, any vibration caused by piston motion in one Stirling engine power module arranged at one position in the upper level is effectively cancelled out in the rotary direction by vibration caused by piston motion in the other Stirling engine power module arranged at the corresponding position in the lower level. Vibration between the upper and lower levels of Stirling engine power modules is also minimal due to the cancellation of vibratory moments between levels.

In one embodiment, the number of Stirling engine power modules included within the multi-cylinder Stirling engine 1620 corresponds to the number of sides of the closed loop. In such an embodiment, in a multi-cylinder Stirling engine 1620 including eight Stirling engine power modules (e.g., with four Stirling engine power modules in each level), the shape of the closed loop would resemble a square, or be rectangular. In a multi-cylinder Stirling engine 1620 including ten Stirling engine power modules (e.g., with five Stirling engine power modules in each level), the shape of the closed loop would be pentagonal. Thus, closed loop shape of the multi-cylinder Stirling engine 1620 can be any polygonal shape (e.g., hexagonal, heptagonal, octagonal, etc.), depending on the number of Stirling engine power modules (e.g., six, seven, eight, etc.) that are included within each level of the multi-cylinder Stirling engine. It will be appreciated that the operational phase difference between each adjacent Stirling engine power module can correspond to the number of sides of the closed loop. For example, when the closed loop of the Stirling engine 1620 has four sides, the operational phase difference between adjacent Stirling engine modules is approximately 45 degrees.

Stirling Engine Using Thermal Energy Recovery System

Figure 17:
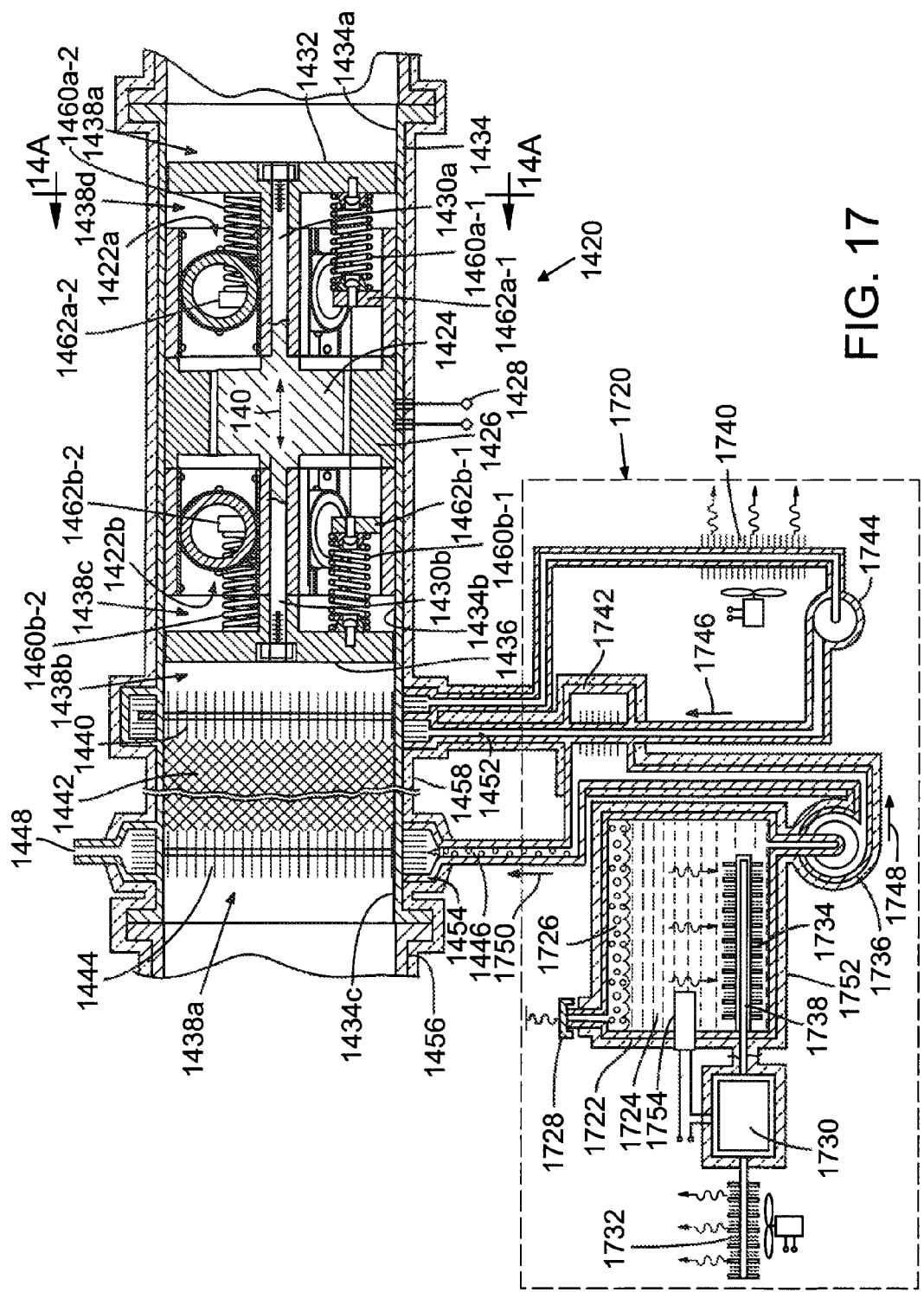
FIG. 17 is a cross-sectional, schematic view of a Stirling engine according to a fifteenth embodiment of the invention.
Figure 23:
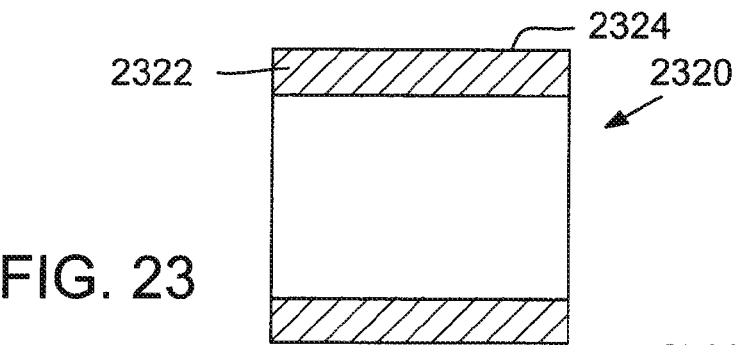
FIGS. 23-29 are cross-sectional views of rollers in roller bearing sub-assemblies according to some embodiments of the invention.
Figure 24:
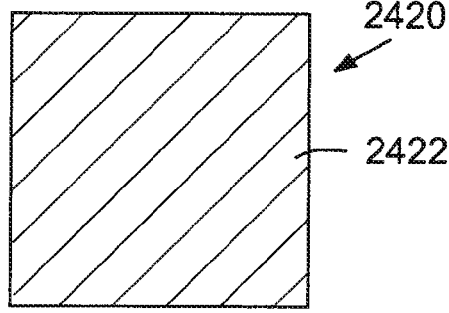

FIG. 17 is a cross-sectional, schematic view of a Stirling engine according to a fifteenth embodiment of the invention.

The thermodynamic (Carnot) efficiency of a Stirling engine is directly proportional to the ratio of the absolute temperature of working gas in the working gas-containing region 1438b to the absolute temperature of working gas in the working gas-containing region 1438a. The thermal energy recovery system 1720 shown in FIG. 17 can lower the temperature of the working gas in the working gas-containing region 1438b, thereby increasing the thermodynamic efficiency of the Stirling engine power module 1420 and its power density, which results in reduced fuel consumption, size, weight and operational cost of the Stirling engine power module 1420.

According to the fifteenth embodiment, a Stirling engine may include a Stirling engine power module and a gasifier. The Stirling engine power module may include a cylinder having an interior configured to retain a working gas, a hot piston and a cold piston reciprocatably moveable within the interior of the cylinder, a burner disposed adjacent to the cylinder and configured to burn gaseous fuel and transmit heat to the interior of the cylinder and a cold-end heat exchanger disposed adjacent to the cylinder and configured to allow coolant to circulate and remove heat from the interior of the cylinder. The gasifier may be coupled to the burner and the cold-end heat exchanger and include a fuel-side thermal-exchange region configured to receive low-temperature liquid fuel retained within a fuel source, and a coolant-side thermal-exchange region configured to receive coolant circulated through the cold-end heat exchanger. The fuel- and coolant-side thermal-exchange regions can be in thermal contact with each other such that thermal energy of coolant received within the coolant-side thermal-exchange region is transferrable to liquid fuel received at the fuel-side thermal exchange region to decrease the temperature of the coolant. The gasifier is configured to return coolant within the coolant-side thermal exchange region to the cold-end heat exchanger. A more detailed discussion of an exemplary thermal energy recovery system will now be described with respect to FIG. 17.

Referring to FIG. 17, a Stirling engine includes at least one Stirling engine power module (e.g., Stirling engine power module 1420) and the thermal energy recovery system 1720. The thermal energy recovery system 1720 includes a fuel source (e.g., a tank 1722 configured to retain a liquefied fuel 1724 and fuel vapor 1726 and having a fill cap 1728 incorporating a safety release valve), a cryocooler (e.g., cryocooler 1730), an ambient heat rejecter (e.g., ambient heat rejecter 1732), a heat acceptor (e.g., heat acceptor 1734), a fuel pump (e.g., fuel pump 1736), a thermal coupler (e.g., thermal coupler 1738), a radiator (e.g., radiator 1740), a gasifier (e.g., gasifier 1742), a coolant pump (e.g., coolant pump 1744), an insulator (e.g., insulator 1752) and a fuel temperature switch (e.g., fuel temperature switch 1754). In other embodiments, the fill cap 1728 and safety release valve may be separate components. Also shown in FIG. 17 is a Stirling engine that includes at least one Stirling engine power module (e.g., the Stirling engine power module 1420). The thermal energy recovery system 1720 can be coupled to the burner 1454 and the cold-end heat exchanger 1450 of one or more Stirling engine power modules 1420. In one embodiment, the radiator 1740 may be omitted.

Within the thermal energy recovery system 1720, the tank 1722 stores a liquefied fuel 1724 which, when heated, can be used as the fuel 1446 for the burner 1454 to burn. In one embodiment, the liquefied fuel 1724 is liquefied natural gas (LNG), which has a boiling point of −162 degrees Centigade. The liquefied fuel 1724 can be maintained within the tank 1722 at cryogenic temperatures by the cryocooler 1730, and its associated heat acceptor 1734 and ambient heat rejecter 1732. The fuel temperature switch 1754 controls the cryocooler 1730 to maintain the temperature of the liquefied fuel 1724 within a predetermined range. The safety relief valve 1728 prevents pressure from building within the tank 1722 to unacceptable levels if the liquefied fuel 1724 were to boil, thereby generating fuel vapor 1726.

The fuel pump 1736 communicates with the tank 1722 (e.g., via one or more pipes) to deliver the liquefied fuel 1724 to the gasifier 1742 (e.g., to a fuel-side thermal exchange region), as indicated by arrow 1748. A coolant-side thermal exchange region of the gasifier 1742 communicates with the coolant pump 1744 (e.g., via one or more pipes), which circulates coolant 1452 from the cold-end heat exchanger 1450 across the radiator 1740 (e.g., as indicated by arrow 1746). As a result, the coolant 1452 that enters the coolant-side thermal exchange region of the gasifier has less thermal energy than the coolant 1452 that is initially output by cold-end heat exchanger 1450. Further, the coolant 1452 entering the coolant-side thermal exchange region of the gasifier 1742 has a higher temperature than the liquefied fuel 1724 that enters into the fuel-side thermal exchange region of the gasifier 1742.

When the fuel 1724 enters into the fuel-side thermal exchange region of the gasifier 1742, thermal energy corresponding to the sensible heat and latent heat of vaporization of the fuel 1724 is transferred from the coolant 1452 to the fuel 1724. As a result of the thermal transfer, the fuel 1724 can be vaporized as fuel 1446 which can be readily burned at burner 1454. Upon transferring thermal energy from the coolant 1452 to the fuel 1724, the thermal energy of the coolant 1452 is further lowered before it is returned to the cold-end heat exchanger 1450. To facilitate the thermal transfer, one or both of the fuel- and coolant-side thermal exchange regions of the gasifier 1724 may comprise any known structures such as fins, tubes, wires, etc., formed of materials having a high-thermal conductivity (e.g., copper, brass, aluminum, or the like or a combination thereof).

Constructed as described above, the thermal energy recovery system 1720 improves the thermodynamic performance of the Stirling engine 1420 by lowering the temperature of the working gas in the working gas-containing region 1438b while reducing the energy required by the burner 1454 to burn the fuel 1446.

In one embodiment, the fuel 1724 can be cooled below its normal boiling point temperature (e.g., periodically) by the cryocooler 1730. The Stirling engine power module 1420 can operate for extended time on this reduced thermal energy in the sub-cooled fuel 1724. Operating costs can also be reduced by sub-cooling the fuel 1724 at times of off-peak power demand.

In the illustrated embodiment, the cryocooler 1730 is an integral part of the thermal energy recovery system 1720. In other embodiments, however, the cryocooler 1730 can be detached from the tank 1724 by, for example, removing the thermal coupler 1738 from the heat acceptor 1734 and disconnecting the electrical connections to the fuel temperature switch 1754.

Roller Bearing Sub-Assembly Components

FIGS. 18-22 are perspective views of various mounting portions in roller bearing sub-assemblies, according to some embodiments of the invention.

Strap-supporting surfaces of the various mounting portions described above are planar along the longitudinal direction of the straps, as well as along a direction transverse to the longitudinal direction. This is generically shown in FIG. 18, where a mounting portion 1820 includes a strap-supporting surface 1822 that is planar along the longitudinal direction of the straps, as well as along a direction transverse to the longitudinal direction. This configuration generally functions well. But when mated with a flat strap, the roller bearing sub-assembly is vulnerable to binding up if a foreign particle becomes lodged between the strap and mounting portion. It can be useful to provide a mounting portion with a strap-supporting surface that includes troughs extending along the longitudinal direction of the straps (i.e., along the selected direction indicated by arrow 140) that can accept debris to prevent binding or other resistance to motion. Examples of such mounting portions are illustrated in FIGS. 19-22.

Referring to FIG. 19, a mounting portion may be provided as mounting portion 1920, including a plurality of polygonal rods 1922 bonded (e.g., by brazing, soldering, epoxy bonding, or the like or a combination thereof) or otherwise coupled together (e.g., by mechanical fasteners) to form a strap-supporting surface having ridges 1924 and troughs 1926 extending along the longitudinal direction of the straps. Although the mounting portion 1920 is illustrated as having rods 1922 that are hexagonal in cross-section, it will be appreciated that the rods 1922 may have any polygonal shape having an even number of sides when viewed in cross-section. It will also be appreciated that any of the mounting portions described above may be additionally configured to include the longitudinal ridges 1924 and troughs 1926 shown in FIG. 19.

Referring to FIG. 20, a mounting portion may be provided as mounting portion 2020, including a corrugated sheet 2022 to form a strap-supporting surface having ridges 2024 and troughs 2026 extending along the longitudinal direction of the straps. It will also be appreciated that any of the mounting portions described above may be additionally configured to include the longitudinal ridges 2024 and troughs 2026 shown in FIG. 20.

Referring to FIG. 21, a mounting portion may be provided as mounting portion 2120, including circular rods 2122 bonded (e.g., by brazing, soldering, epoxy bonding, or the like or a combination thereof) or otherwise coupled together (e.g., by mechanical fasteners) to form a strap-supporting surface having a plurality of ridges 2124 and a plurality of troughs 2126 extending along the longitudinal direction of the straps. Although the mounting portion 2120 is illustrated as having rods 2122 that are circular in cross-section, it will be appreciated that the rods 2122 may have an elliptical shape when viewed in cross-section. It will also be appreciated that any of the mounting portions described above may be additionally configured to include the longitudinal ridges 2124 and troughs 2126 shown in FIG. 21.

Referring to FIG. 22, a mounting portion may be provided as mounting portion 2220, including a contoured sheet 2222 configured to form a strap-supporting surface having a plurality of ridges 2224 and a plurality of troughs 2226 extending along the longitudinal direction of the straps. It will also be appreciated that any of the mounting portions described above may be additionally configured to include the longitudinal ridges 2224 and troughs 2226 shown in FIG. 22.

FIGS. 23-29 are cross-sectional views of rollers in roller bearing sub-assemblies according to some embodiments of the invention.

As described above, rollers are generally provided as hollow, cylindrical structures having a substantially constant diameter along their axis to produce a rolling surface that is planar along the axis of the roller. This is generically shown in FIG. 23, where a roller 2320 includes a hollow cylinder 2322 defining a rolling surface 2324 that is planar along its longitudinal axis. It will be appreciated that the rollers described herein can also be provided as solid rollers, such as roller 2420 having a solid cylinder 2422 shown in FIG. 24. These configurations generally function well. But when mated with a flat strap, the roller bearing sub-assembly is vulnerable to binding up if a foreign particle becomes lodged between a strap and the roller. It can be useful to provide the roller with troughs extending circumferentially around the roller (i.e., along the selected direction indicated by arrow 140), which accept debris to prevent binding or other resistance to motion. Examples of such rollers are illustrated in FIGS. 25-29. In all embodiments, it will be appreciated that light-weight rollers with reduced rotational moments of inertia advantageously allow a higher operational speed. Also, lower inertia forces reduce tensile loads in the straps and attachments imposed during reversal of roller direction at the ends of stroke. Additionally, thin-walled rollers can provide radial flexibility permitting radial pre-loading of the roller bearing sub-assembly.

Figure 25:
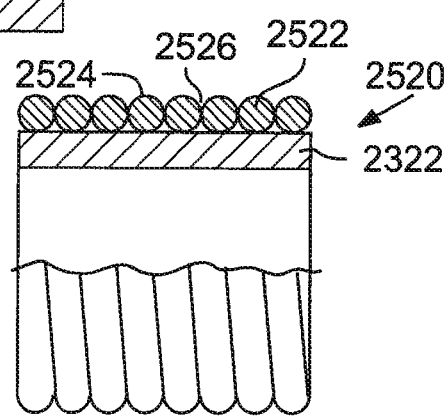

Referring to FIG. 25, a roller 2520 may include the cylinder 2322 and wire 2522 wrapped helically around the cylinder 2322 to form a rolling surface having helical ridges 2524 and helical troughs 2526 extending circumferentially around the cylinder 2322. It will be appreciated that any of the rollers described above may be additionally configured to include the circumferential ridges 2524 and troughs 2526 shown in FIG. 25.

Figure 26:
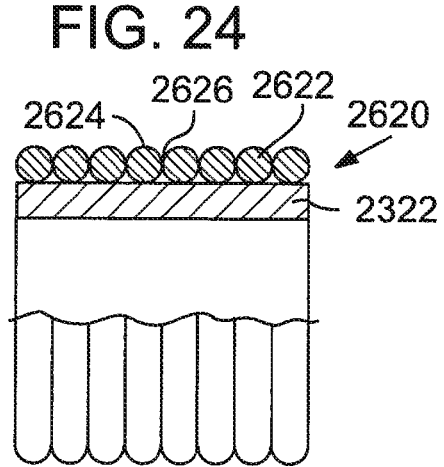

Referring to FIG. 26, a roller 2620 may include the cylinder 2322 and wires 2622 wrapped around the cylinder 2322 to form a rolling surface having ridges 2624 and troughs 2626 extending circumferentially around the cylinder 2322. It will be appreciated that any of the rollers described above may be additionally configured to include the circumferential ridges 2624 and troughs 2626 shown in FIG. 26.

Figure 27:
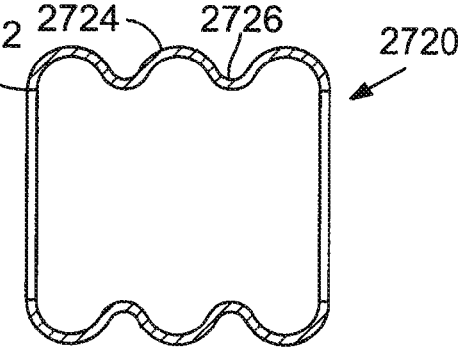

Referring to FIG. 27, a roller 2720 may include a corrugated cylinder 2722 forming a rolling surface configured to have ridges 2724 and troughs 2726 extending circumferentially around the cylinder 2722. It will be appreciated that any of the rollers described above may be additionally configured to include the circumferential ridges 2724 and troughs 2726 shown in FIG. 27.

Figure 28:
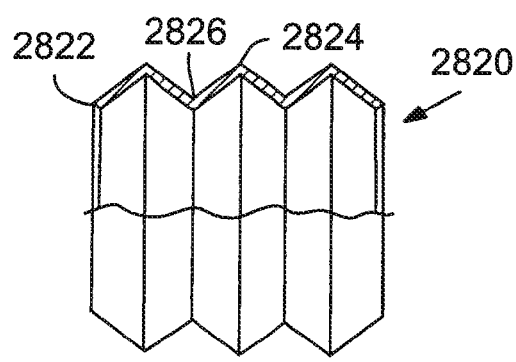

Referring to FIG. 28, a roller 2820 may include a corrugated cylinder 2822 forming a rolling surface configured to have ridges 2824 and troughs 2826 extending circumferentially around the cylinder 2822. It will be appreciated that any of the rollers described above may be additionally configured to include the circumferential ridges 2824 and troughs 2826 shown in FIG. 28.

Figure 29:
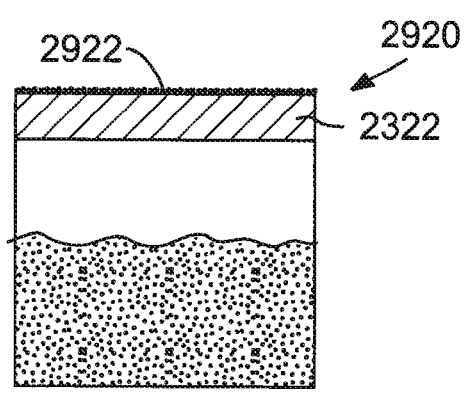

Referring to FIG. 29, a roller 2920 may include the cylinder 2322 and texturizing material 2922 formed on the cylinder 2322 dispersed on the rolling surface to form a tortuous arrangement of troughs or cavities. It will be appreciated that any of the rollers described above may be additionally configured to include the texturizing material.

FIGS. 30-34 are top views of straps in roller bearing sub-assemblies according to some embodiments of the invention. FIGS. 30A-34A are cross-sectional views of straps shown in FIGS. 30-34, respectively, according to some embodiments of the invention.

Straps described above are planar. This is generically shown in FIGS. 30 and 30A, where a strap 3020 includes a strap body 3022 having uniform width and attachment regions 3024 where attachments such as attachments 134, 136 and 138 attach the strap to various structures. This configuration generally functions well. But when mated with a flat mounting portion or roller, the roller bearing sub-assembly is vulnerable to binding up if a foreign particle becomes lodged between the strap and adjacent structures. It can be useful to configure one or more straps such that one or more strap surfaces includes troughs extending along the longitudinal direction of the straps (i.e., along the selected direction indicated by arrow 140) that can accept debris to prevent binding or other resistance to motion. Examples of such mounting portions are illustrated in FIGS. 31-34A.

Referring to FIGS. 31 and 31A, a strap 3120 includes strap bodies 3122 each having an attachment region 3024 and wires 3124 extending between adjacent strap bodies 3122. The wires 3124 may be attached to the strap bodies 3122 by any suitable method (e.g., by brazing, welding, soldering, adhesive bonding, sinter bonding, or the like or a combination thereof). The wires 3124 define ridges 3126 and troughs 3128 extending along the longitudinal direction of the strap 3120, which can accept debris to prevent binding or other resistance to motion. Lateral vibration of the wires 3124 can be damped by their close contact or by adjacent bonding (e.g., by brazing, welding, soldering, adhesive bonding, sinter bonding, or the like or a combination thereof).

Referring to FIGS. 32 and 32A, a strap 3220 includes a strap body 3222 having attachment regions 3024 and slots 3224 extending between adjacent attachment regions 3124. The slots 3224 extend along the longitudinal direction of the strap 3220, which can accept debris to prevent binding or other resistance to motion. The slots 3224 can be formed by, for example, providing a strap body such as strap body 3022 and forming slots therein according to any suitable method (e.g., by saw-cutting, drilling, punching, or the like, or a combination thereof).

Referring to FIGS. 33 and 33A, a strap 3320 includes the strap bodies 3322 and a wire 3324 extending between adjacent ones of the strap bodies 3322. Each wire 3324 may be attached to a strap body 3222 by any suitable method (e.g., by brazing, welding, soldering, adhesive bonding, sinter bonding, or the like or a combination thereof).

Referring to FIGS. 34 and 34A, a strap 3420 includes wires 3422 defining ridges 3424 and troughs 3426 extending along the longitudinal direction of the strap 3420, which can accept debris to prevent binding or other resistance to motion. Lateral vibration of the wires 3424 can be damped by their close contact or by adjacent bonding (e.g., by brazing, welding, soldering, adhesive bonding, sinter bonding, or the like or a combination thereof).

While the embodiments of the present invention have been particularly shown and described above, it will be understood by one of ordinary skill in the art that various changes in form and details may be made therein without departing from the spirit and scope of the present invention as defined by the following claims.

What is claimed is:

1. A linear roller bearing assembly, comprising:
a hub;
a collar disposed around the hub; and
roller bearing sub-assemblies disposed in a radial pattern around the hub and configured to guide linear movement of the hub relative to the collar along a selected direction, wherein each of the roller bearing sub-assemblies includes:
a roller; and
straps wrapped partially around different portions of the roller, wherein each of the straps is connected to at least one of the hub and the collar, wherein at least one of the straps is connected to the roller and wherein at least one of the straps is circumferentially free of the roller.

2. A linear roller bearing assembly, comprising:
a hub;
a collar disposed around the hub; and
roller bearing sub-assemblies disposed in a radial pattern around the hub and configured to guide linear movement of the hub relative to the collar along a selected direction, wherein each of the roller bearing sub-assemblies includes:
a roller; and
straps wrapped partially around different portions of the roller,
wherein the hub, collar and roller bearing sub-assemblies are configured such that the hub and collar are moveable relative to each other along the selected direction for a distance that is approximately half of a circumference of the roller in opposite directions from a mid-stroke position.

3. The linear roller bearing assembly of claim 1, further comprising a tensioning device coupled to the collar and to a selected strap of each of the roller bearing sub-assemblies, the tensioning device configured to adjust an amount of tension within the selected strap.

4. The linear roller bearing assembly of claim 2, wherein the hub and collar are moveably coupled to each other such that an axis of the hub can be radially positioned with respect to an axis of the collar.

5. The linear roller bearing assembly of any of claim 1 or 2, wherein each roller bearing sub-assembly further includes:
a first mounting portion disposed on one side of the roller; and
a second mounting portion disposed on another side of the roller,
wherein the first mounting portion and the second mounting portion have a strap-supporting surface configured to contact the straps, and
wherein the strap-supporting surface of at least one of the first mounting portion and the second mounting portion includes at least one trough extending along the selected direction.

6. The linear roller bearing assembly of any of claim 1 or 2, wherein each roller bearing sub-assembly further includes:
a first mounting portion disposed on one side of the roller; and
a second mounting portion disposed on another side of the roller,
wherein the first mounting portion and the second mounting portion have a strap-supporting surface configured to contact the straps, and
wherein, within at least one roller bearing sub-assembly, the roller contacts at least one of the first mounting portion and the second mounting portion.

7. The linear roller bearing assembly of any of claim 1 or 2, wherein, within at least one roller bearing sub-assembly, a surface of at least one of the roller and a strap includes at least one trough extending along the selected direction.

8. The linear roller bearing assembly of any of claim 1 or 2, wherein the hub and the collar are configured to be connected to different components of a machine, the different components being translationally moveable relative to each other.

9. The linear roller bearing assembly of claim 8, wherein at least one of the hub and collar is configured to be connected to a reciprocatably moveable component of the machine.

10. The linear roller bearing assembly of claim 8, wherein the machine is a Stirling engine, a cryocooler, a pump, or a refrigerator.

11. The linear roller bearing assembly of any of claim 1 or 2, wherein, within at least one roller bearing sub-assembly, at least one strap is formed of an electrically conductive material and wherein the linear roller bearing assembly is configured to electrically connect components within a machine.

12. A method of forming a linear roller bearing assembly, comprising:
   forming at least three bores extending through a workpiece;
   forming gaps extending through the work piece, wherein each gap communicates with two bores to separate the workpiece into a hub and a collar disposed around the hub;
   disposing rollers in a radial pattern between the hub and collar, wherein the rollers are disposed within at least three of the bores and wherein straps are wrapped partially around different portions of each of the rollers; and
   coupling each of the straps to at least one of the hub and the collar thereby forming at least three roller-bearing subassemblies configured to guide linear movement of the hub relative to the collar along a selected direction.

13. The method of claim 12, wherein the workpiece comprises a central bore and wherein the bores are disposed in a regular pattern around the central bore.

14. A multi-cylinder Stirling engine, comprising:
   at least three Stirling engine power modules disposed in a closed loop having a polygonal shape; and
   working gas manifolds coupled between each of the Stirling engine power modules such that an interior of each Stirling engine power module communicates with interiors of two other Stirling engine modules;
   wherein the closed loop comprises a first level of Stirling engine power modules and a second level of Stirling engine power modules; and
   wherein each working gas manifold is coupled between a Stirling engine power module disposed in one side of the polygonal shape in the first level of the closed loop and another Stirling engine power module disposed in another side of the polygonal shape in the second level of the closed loop.

15. The multi-cylinder Stirling engine of claim 14, wherein the polygonal shape is a triangular shape.

16. The multi-cylinder Stirling engine of claim 14, wherein the at least three Stirling engine power modules and working gas manifolds are configured such that three Stirling engine power modules operate approximately 120 degrees out of phase with each other.

17. The multi-cylinder Stirling engine of claim 14, wherein the at least three Stirling engine power modules and working gas manifolds are configured such that six Stirling engine power modules operate approximately 60 degrees out of phase with each other.

18. A multi-cylinder Stirling engine, comprising:
   at least three Stirling engine power modules; and
   working gas manifolds coupled between each of the Stirling engine power modules such that an interior of each Stirling engine power module communicates with interiors of two other Stirling engine modules, wherein each of the Stirling engine power modules comprises:
   a cylinder coupled between two working gas manifolds, wherein the cylinder is configured to retain a working gas;
   a guiding mechanism disposed within an interior of the cylinder;
   a hot piston and a cold piston coupled to the guiding mechanism, wherein the hot piston and the cold piston are reciprocatably moveable within the interior of the cylinder; and
   a linear alternator including:
      a stator fixedly disposed within the interior of the cylinder; and
      an armature fixedly coupled between the hot piston and the cold piston, wherein the armature is reciprocatably moveable relative to the stator to generate electrical power.

19. The multi-cylinder Stirling engine of claim 18, wherein the armature is configured to also act as a piston having a smaller area than the hot piston and the cold piston.

20. A Stirling engine, comprising:
   a Stirling engine power module including:
      a cylinder having an interior configured to retain a working gas;
      a hot piston and a cold piston reciprocatably moveable within the interior of the cylinder;
      a burner disposed adjacent to the cylinder and configured to burn gaseous fuel and transmit heat to the interior of the cylinder; and
      a cold-end heat exchanger disposed adjacent to the cylinder and configured to allow coolant to circulate and remove heat from the interior of the cylinder; and
   a gasifier coupled to the burner and the cold-end heat exchanger, the gasifier including:
      a fuel-side thermal-exchange region configured to receive low-temperature liquid fuel retained within a fuel source; and
      a coolant-side thermal-exchange region configured to receive coolant circulated through the cold-end heat exchanger,
      wherein the fuel- and coolant-side thermal-exchange regions are in thermal contact with each other such that thermal energy of coolant received within the coolant-side thermal-exchange region is transferrable to liquid fuel received at the fuel-side thermal exchange region to decrease the temperature of the coolant, and
      wherein the gasifier is configured to return coolant within the coolant-side thermal exchange region to the cold-end heat exchanger.

21. The Stirling engine of claim 20, wherein the thermal energy of coolant received within the coolant-side thermal-exchange region is transferrable to liquid fuel received at the fuel-side thermal exchange region to raise the temperature and vaporize the liquid fuel.

22. The multi-cylinder Stirling engine of claim 18, wherein the Stirling engine power modules and working gas manifolds are configured such that three Stirling engine power modules operate approximately 120 degrees out of phase with each other.

23. The multi-cylinder Stirling engine of claim 18, wherein the Stirling engine power modules and working gas manifolds are configured such that six Stirling engine power modules operate approximately 60 degrees out of phase with each other.

* * * * *